United States Patent
Hayashi et al.

[11] Patent Number: 6,035,253
[45] Date of Patent: Mar. 7, 2000

[54] NAVIGATION APPARATUS FOR A VEHICLE AND A RECORDING MEDIUM FOR USE IN THE SAME

[75] Inventors: Seiji Hayashi, Anjo; Mitsuhiro Nimura, Okazaki; Yasunobu Ito, Anjo, all of Japan

[73] Assignee: Aisin Aw Co., Ltd., Japan

[21] Appl. No.: 08/735,597

[22] Filed: Oct. 23, 1996

[30] Foreign Application Priority Data

Nov. 9, 1995 [JP] Japan .................................... 7-290746
Apr. 26, 1996 [JP] Japan .................................... 8-108148

[51] Int. Cl.[7] ........................ G08G 1/0969; G06F 165/00
[52] U.S. Cl. ......................... 701/211; 701/201; 701/209; 340/995
[58] Field of Search .................................. 701/201, 208, 701/209, 213, 211; 340/995

[56] References Cited

U.S. PATENT DOCUMENTS

| | | | |
|---|---|---|---|
| 4,504,913 | 3/1985 | Miura et al. | 364/449 |
| 4,527,155 | 7/1985 | Yamaki et al. | 340/727 |
| 4,532,514 | 7/1985 | Hatano et al. | 340/995 |
| 4,543,522 | 9/1985 | Tanaka et al. | 340/723 |
| 4,638,438 | 1/1987 | Endo et al. | 364/424 |
| 5,115,398 | 5/1992 | De Jong | 364/443 |
| 5,787,382 | 7/1998 | Kurabayashi | 701/214 |

FOREIGN PATENT DOCUMENTS

| | | |
|---|---|---|
| 0486354 | 5/1992 | European Pat. Off. . |
| 0579451 | 1/1994 | European Pat. Off. . |
| 0660290 | 6/1995 | European Pat. Off. . |
| 1173298 | 7/1989 | Japan . |
| 23899 | 1/1990 | Japan . |
| 275909 | 3/1990 | Japan . |
| 5165407 | 7/1993 | Japan . |

OTHER PUBLICATIONS

Patent Abstracts of Japan, vol. 18, No. 587 (P–1824) Nov. 10, 1994.

*Primary Examiner*—Michael Zanelli
*Attorney, Agent, or Firm*—Lorusso & Loud

[57] ABSTRACT

In a navigation apparatus for a vehicle, after the present position of a vehicle is obtained, a position on a map which corresponds to the present position of the vehicle is obtained. Subsequently, the heading direction of the vehicle is detected. When the vehicle is traveling on the left-hand lane, coordinate conversion is performed such that a present position mark is shifted leftward from the center of the road by ¼ of the road width. This makes it possible to display a route while preventing the route from overlapping with the centerline of the road. In another navigation apparatus for a vehicle, a structure-profiled map on which a structure-representing shape and a road are drawn is displayed so as to provide road guidance, wherein a route is displayed on the structure-profiled map along a road which is displayed for guidance. The display of the route is performed such that the route is shifted from the center line of a road toward a lane on which the vehicle is traveling. The route is displayed by using a pattern having a width corresponding to the width of the road in accordance with the lane of the road to be guided.

29 Claims, 23 Drawing Sheets

Fig. 3 (A)
INTERSECTION DATA

| NUMBER OF INTERSECTIONS (n) | |
|---|---|
| 1 | INTERSECTION NUMBER |
|  | COORDINATES OF INTERSECTION (LONGITUDE, LATITUDE) |
|  | CONNECTION ROAD INFORMATION |
|  | ADDRESS AND SIZE OF LANDMARK DATA |
|  | ⋮ |
| n |  |

Fig. 3 (B)
LANDMARK DATA

| NUMBER OF LANDMARKS (m) | |
|---|---|
| 1 | COORDINATES OF LANDMARK (LONGITUDE, LATITUDE) |
|  | MARK PATTERN NUMBER |
|  | ROAD NUMBER ALONG WHICH LANDMARK EXISTS |
|  | ⋮ |
| m |  |

Fig. 3 (C)
MARK PATTERN DATA

0 : GRAPHIC DATA OF AA BANK MARK

1 : GRAPHIC DATA OF BB BANK MARK

2 : GRAPHIC DATA OF CC BANK MARK

3 : GRAPHIC DATA OF DD GAS STATION MARK

4 : GRAPHIC DATA OF EE GAS STATION MARK

| ROAD NUMBER | ROAD NUMBER OF ROAD HAVING THE SAME START POINT | ROAD NUMBER OF ROAD HAVING THE SAME END POINT | START POINT | END POINT | NODE SERIES POINTER | ROAD LENGTH (m) | LANDMARK NUMBER |
|---|---|---|---|---|---|---|---|
| ① | ⑪ | ④ | II | I | A000 | 1000 | |
| ② | ③ | ⑫ | I | II | A0A0 | 1000 | |
| ③ | ② | ⑥ | I | IV | A0B3 | 2000 | |
| ④ | ⑤ | ① | IV | I | A0C0 | 2000 | |
| ⑤ | ⑧ | ⑤ | IV | III | A0DE | 1500 | |
| ⑥ | ⑥ | ⑦ | III | IV | A101 | 1500 | |
| ⑦ | ⑫ | ⑩ | V | IV | A201 | 800 | |
| ⑧ | ⑨ | ⑪ | IV | V | A221 | 800 | |
| ⑨ | ④ | ⑨ | IV | VII | A253 | | |
| ⑩ | ⑩ | ③ | VII | IV | A260 | | |
| ⑪ | ① | ⑬ | II | V | A265 | | |
| ⑫ | ⑭ | ② | V | II | A28B | | |
| ⑬ | ⑬ | ⑧ | VI | V | A2A0 | | |
| ⑭ | ⑦ | ⑭ | V | VI | A2B0 | | |

Fig. 5 (A)
GUIDANCE ROAD DATA

| NUMBER OF ROADS (n) | |
|---|---|
| 1 | ROAD NUMBER |
|   | LENGTH |
|   | ROAD ATTRIBUTE DATA |
|   | ADDRESS AND SIZE OF SHAPE DATA |
|   | ADDRESS AND SIZE OF GUIDANCE DATA |
|   | . |
|   | . |
|   | . |
| n |   |

Fig. 5 (B)
SHAPE DATA

| NUMBER OF NODES (m) | |
|---|---|
| 1 | LONGITUDE |
|   | LATITUDE |
|   | . |
|   | . |
|   | . |
| m |   |

Fig. 5 (C)
GUIDANCE DATA

| INTERSECTION NAME |
|---|
| PRESENCE/ABSENCE OF TRAFFIC SIGNAL |
| LANDMARK DATA |
| CAUTION POINT DATA |
| ROAD NAME |
| ADDRESS AND SIZE OF ROAD NAME VOICE DATA |
| ADDRESS AND SIZE OF PLACE-TO-GO DATA |

Fig. 5 (D)
PLACE-TO-GO DATA

| NUMBER OF PLACES TO GO (k) | |
|---|---|
| 1 | ROAD NUMBER OF PLACE TO GO |
|   | NAME OF PLACE TO GO |
|   | ADDRESS AND SIZE OF PLACE-TO-GO NAME VOICE DATA |
|   | DIRECTION-TO-GO DATA |
|   | TRAVEL GUIDANCE DATA |
|   | . |
|   | . |
|   | . |
| k |   |

Fig. 5 (E)
DIRECTION-TO-GO DATA

- −1 = INVALID
- 0 = UNNECESSARY
- 1 = STRAIGHT
- 2 = RIGHTWARD DIRECTION
- 3 = RIGHTWARD DIRECTION WITH ANGLE
- 4 = RIGHTWARD RETURN DIRECTION
- 5 = LEFTWARD DIRECTION
- 6 = LEFTWARD DIRECTION WITH ANGLE
- 7 = LEFTWARD RETURN DIRECTION

Fig. 6 (A)
ROAD ATTRIBUTE DATA

INFORMATION REGARDING PRESENCE/ABSENCE (PRESENCE : ○)

| | | |
|---|---|---|
| ELEVATED/ UNDERGROUND DATA | ELEVATED ROAD | |
| | ADJACENT TO ELEVATED ROAD | |
| | UNDERGROUND ROAD | ○ |
| | ADJACENT TO UNDERGROUND ROAD | |
| NUMBER OF LANES | THREE OR MORE LANES | |
| | TWO LANES | ○ |
| | ONE LANES | |
| | NO CENTERLINE | |

Fig. 6 (B)
ROAD NAME DATA

| ROAD TYPE | SUB-TYPE NUMBER |
|---|---|

| | | |
|---|---|---|
| FREEWAY | MAIN ROAD | 1 |
| | CONNECTION ROAD | 2 |
| URBAN FREEWAY | MAIN ROAD | 3 |
| | CONNECTION ROAD | 4 |
| TOLL ROAD | MAIN ROAD | 5 |
| | CONNECTION ROAD | 6 |
| NATIONAL ROAD | | 7 |
| PREFECTURAL ROAD | | 8 |
| OTHERS | | 9 |

Fig. 6 (C)
CAUTION POINT DATA

| | |
|---|---|
| RAILWAY CROSSING | ○ |
| ENTERANCE OF TUNNEL | |
| EXIT OF TUNNEL | |
| ROAD WIDTH DECREASING POINT | |
| NONE | |

Fig. 6 (D)
TRAVEL GUIDANCE DATA

| | |
|---|---|
| OFFSET RIGHTWARD | |
| OFFSET LEFTWARD | |
| AT THE CENTER | ○ |
| NONE | |

MANNER – OF – DISPLAY
DETERMINATION TABLE

| PUBLIC FACILITIES | | COLOR a |
|---|---|---|
| DETAILED INFORMATION (NUMBER m OF NAMES) | $a \leq m$ | COLOR b |
| | $m < a$ | COLOR b (LIGHT) |
| HEIGHT h NUMBER OF STORIES | $\gamma < h$ $\beta <$ NUMBER OF STORIES | COLOR c (MESHED) |
| GUIDANCE ROUTE | | COLOR d |

NAVIGATION APPARATUS FOR A VEHICLE AND A RECORDING MEDIUM FOR USE IN THE SAME

BACKGROUND OF THE INVENTION

1. Field of the Invention

The present invention relates to a navigation apparatus for a vehicle which determines a route to a destination, and which provides route guidance while the vehicle travels.

The present invention also relates to a navigation apparatus for a vehicle which displays a structure-profiled map so as to provide road guidance, as well as to a recording medium for use in the same.

2. Description of the Related Art

Conventionally, there has been proposed a navigation apparatus which detects the present position of a vehicle using a present position detecting unit such as a GPS sensor, and which displays a present position mark on a map based on the detected present position, thereby providing guidance.

When only the present position detecting unit is used to display the present position mark, the displayed present position mark may deviate from an actual position due to poor accuracy of detection. Thus, in order to display the present position mark on a displayed road after compensating a detection error, there has been used a technique wherein data regarding the shape of a road is stored beforehand, and the track of travel of the vehicle is compared with the stored shape of a road so as to obtain a road whose shape is most similar to the track of travel. When the detected present position deviates from the obtained road, the deviation of the present position is compensated so as to display the present position mark on the road.

In order to accurately display the present position mark through the above-described compensation processing, the present position mark is displayed on a road map in which mutually connected roads are represented by mutually connected lines, thereby providing route guidance.

In this conventional navigation apparatus, the present position can be displayed at an acceptable accuracy of display because mutually connected roads are represented by mutually connected lines. However, it is difficult for a driver to recognize the present position because the road on which the vehicle is traveling is not displayed in a distinctive manner.

In a certain navigation apparatus for a vehicle, a route to a destination is determined based on input data regarding locations such as a start point and a destination, and based on the determined route, route guidance is provided using a guidance screen and voice. This guidance screen displays a map of an area in the vicinity of the present position.

When an ordinary road map is displayed, since the types of roads such as a main road and a local road are differentiated only by use of lines having different thicknesses, the determined guidance route is displayed on the map in a distinctive manner such that a different color of display is used or a thicker line is used. When a structure-profiled map is displayed, since a road is displayed such that it has a width corresponding to an actual road width, the displayed guidance route is less likely to be recognizable. For example, in the case of a two-way road, when the same number of lanes are provided for both directions of traffic, the guidance route is displayed on the centerline of the road. Also, when a larger number of lanes are provided for traffic traveling in the opposite direction, the centerline is shifted toward the traffic side to which the vehicle belongs. As a result, the guidance route is displayed on the opposite traffic side.

SUMMARY OF THE INVENTION

An object of the present invention is to provide a navigation apparatus for a vehicle which enables a driver to readily recognize the present position of a vehicle, and which can accurately display the present position.

Another object of the present invention is to provide a navigation apparatus for a vehicle which displays a guidance route on a structure-profiled map such that the guidance route is displayed on a lane on which the vehicle is traveling, and is not superimposed on the centerline.

Still another object of the present invention is to provide a recording medium for use in the above navigation apparatus.

In order to achieve the above objects, the present invention provides a navigation apparatus for a vehicle in which an entire route from a start point to a destination is determined and the vehicle is guided to the destination in accordance with the determined route. In the navigation apparatus, there can be displayed alternatively a road map and a road-profiled map on which a road is displayed with a widthwise shape. Also, on either of the maps can be displayed the present position of the vehicle as detected by present position detecting means.

The present invention also provides a navigation apparatus for a vehicle in which an entire route from a start point to a designated destination is determined, the present position of the vehicle is detected, and route guidance processing is executed based on the detected present position.

The navigation apparatus comprises information storage means for storing data regarding a road-profiled map on which a road is displayed with a widthwise shape, present position detecting means for detecting the present position of the vehicle, matching means for comparing the track of the detected present position with the shape of a road whose data is stored in the information storage means, so as to judge whether they match, and display control means for shifting the present position onto a road which has been judged by the matching means to correspond to the track of the present position, as well as for displaying the present position on the road appearing on the road-profiled map.

Preferably, the information storage means contains information regarding one-way traffic, and the display control means modifies the position of display of the present position based on information regarding one-way traffic.

Preferably, the display control means is adapted to display the present position at the center of a road when the road is judged to be a one-way road, as well as to display the present position at a position shifted by a predetermined amount from the center of a road when the road is judged to not be a one-way road.

The present invention further provides a navigation apparatus for a vehicle in which an entire route from a start point to a designated destination is determined, the present position of the vehicle is detected, and route guidance processing is executed based on the detected present position. The navigation apparatus comprises information storage means for storing data regarding a road map in which a road is represented using road data composed of data regarding nodes, as well as for storing data regarding a road-profiled map on which a road is displayed with a widthwise shape, map information switching means for switching the road map to and from the road-profiled map, and matching means for converting the detected present position of the vehicle to a coordinate on the road data. The information storage means contains information regarding the width of a road. When the road-profiled map is displayed through the map information switching means, the matching means further shifts the converted coordinate by a predetermined amount in accordance with the width of a road on which the present position lies, thereby displaying the present position at the shifted coordinate.

As described above, according to the present invention, a present position mark can be accurately displayed on a road-profiled map, thereby providing a user with guidance information such that the user can readily view and recognize the information.

In the present invention, by "road-profiled map" is meant a map on which a road is displayed such that it has a lane(s) and width.

Viewing a road-profiled map, a user can recognize the number of lanes of a road on which the vehicle is traveling, as well as the width of the road. Particularly, the present position mark is displayed at a different position between a one-way road and a two-way road, and thus the user can readily recognize the current state of traveling.

The present invention further provides a navigation apparatus for a vehicle in which is displayed a structure-profiled map on which a structure-representing shape and a road are drawn, so as to provide road guidance, and in which a route is displayed on the structure-profiled map along a road displayed for guidance. The guidance route is displayed such that it is shifted from the centerline of a road onto a lane on which the vehicle is traveling. The guidance route is displayed using a pattern whose width corresponds to the width of a road on which the vehicle is traveling. This width of the road depends on whether or not the road is a one-way road. The guidance route is displayed in accordance with the type of traffic of a road on which the vehicle is traveling, i.e. in accordance with whether the road is a one-way road or a two-way road. The guidance route is displayed in accordance with guidance information regarding right-turn/left-turn at an intersection located ahead of the present position and an associated change of lanes on which the vehicle is to travel.

The present invention further provides a navigation apparatus for a vehicle in which is displayed a structure-profiled map on which a structure-representing shape and a road are drawn, so as to provide road guidance, and in which a guidance route is displayed on the structure-profiled map along a road displayed for guidance. The navigation apparatus comprises recording-medium read out means for reading out a program and data from a recording medium so as to display for road guidance a structure-profiled map on which a structure-representing shape and a road are drawn, nonvolatile recording means for recording a program, program read in means for reading into the nonvolatile recording means a program which is read out from a recording medium through the recording-medium read out means, display means for displaying the structure-profiled map, and processing means for executing a program which is read in through the program read in means, for displaying the structure-profiled map on the display means based on data which is read out from the recording medium through the recording-medium read out means, and for thereby providing road guidance.

The present invention further provides a navigation apparatus for a vehicle in which an entire route from a start point to a destination is calculated, and visual or voice guidance is provided as the present position of the vehicle moves. The navigation apparatus comprises storage means for storing structure shape information which includes information regarding roads, range-of-display determining means for determining the range of display for a route which is calculated based on information regarding a road which is stored in the storage means, and display control means for superimposing the calculated route on a road based on structure shape information stored in the storage means as well as the range of display determined by the range-of-display determining means, so as to create map information, and to display the created information.

The present invention further provides a navigation apparatus for a vehicle which comprises present position detecting means for detecting the present position of the vehicle, route calculating means for calculating a route from a start point to a destination, storage means for storing structure shape information which includes information regarding roads, range-of-display determining means for determining the range of display for a route which is calculated by the route calculating means based on information regarding a road which is stored in the storage means, display means for displaying map information regarding an area in the vicinity of the present invention based on the present position detected by the present position detecting means and guidance information stored in the storage means, and display control means for controlling display information to be displayed on the display means. The display control means controls display information such that the route is superimposed on a map displayed on the display means, based on the range of display determined by the range-of-display determining means. The range-of-display determining means determines the range of display as follows. A guidance route is displayed such that it is shifted from the centerline of a road onto a lane on which the vehicle is traveling. The guidance route is displayed using a pattern whose width corresponds to the width of a road on which the vehicle is traveling. This width of the road depends on whether or not the road is a one-way road. The guidance route is displayed in accordance with the type of traffic of a road on which the vehicle is traveling, i.e. in accordance with whether the road is a one-way road or a two-way road. The guidance route is displayed in accordance with guidance information regarding right-turn/left-turn at an intersection located ahead of the present position and an associated change of lanes on which the vehicle is to travel.

The present invention further provides a recording medium for use in a navigation apparatus in which is displayed a structure-profiled map on which a structure-presenting shape and a road are drawn, so as to provide road guidance. The recording medium contains structure-profiled map data including information regarding the shape of various kinds of structures as well as attribute information regarding the structures. The recording medium further contains a program for displaying the shape and name of each structure based on the structure-profiled map data as well as for displaying a route on a structure-profiled map along a road displayed for guidance.

BRIEF DESCRIPTION OF THE DRAWINGS

The structure and features of the navigation apparatus for a vehicle and the recording medium for use in the same according to the present invention will be readily appreciated as the same becomes better understood by referring to the drawings, in which:

FIG. 3(A) is an explanatory diagram showing intersection data of the navigation apparatus for a vehicle of the present invention;

FIG. 3(B) is an explanatory diagram showing landmark data of the navigation apparatus for a vehicle of the present invention;

FIG. 3(C) is an explanatory diagram showing mark pattern data of the navigation apparatus for a vehicle of the present invention;

FIG. 4 is an explanatory diagram showing road/route determination data of the navigation apparatus for a vehicle of the present invention;

FIG. 5(A) is an explanatory diagram showing guidance road data included in road data (1) of the navigation apparatus for a vehicle of the present invention;

FIG. 5(B) is an explanatory diagram showing shape data included in road data (1) of the navigation apparatus for a vehicle of the present invention;

FIG. 5(C) is an explanatory diagram showing guidance data included in road data (1) of the navigation apparatus for a vehicle of the present invention;

FIG. 5(D) is an explanatory diagram showing place-to-go data included in road data (1) of the navigation apparatus for a vehicle of the present invention;

FIG. 5(E) is an explanatory diagram showing direction-to-go data included in road data (1) of the navigation apparatus for a vehicle of the present invention;

FIG. 6(A) is an explanatory diagram showing road attribute data included in road data (2) of the navigation apparatus for a vehicle of the present invention;

FIG. 6(B) is an explanatory diagram showing road name data included in road data (2) of the navigation apparatus for a vehicle of the present invention;

FIG. 6(C) is an explanatory diagram showing caution point data included in road data (2) of the navigation apparatus for a vehicle of the present invention;

FIG. 6(D) is an explanatory diagram showing travel guidance data included in road data (2) of the navigation apparatus for a vehicle of the present invention;

DESCRIPTION OF THE PREFERRED EMBODIMENTS

Embodiments of the present invention will next be described in detail with reference to the drawings.

Below is described a system configuration of a navigation apparatus for a vehicle to which the present invention is applied.

Figure 1:
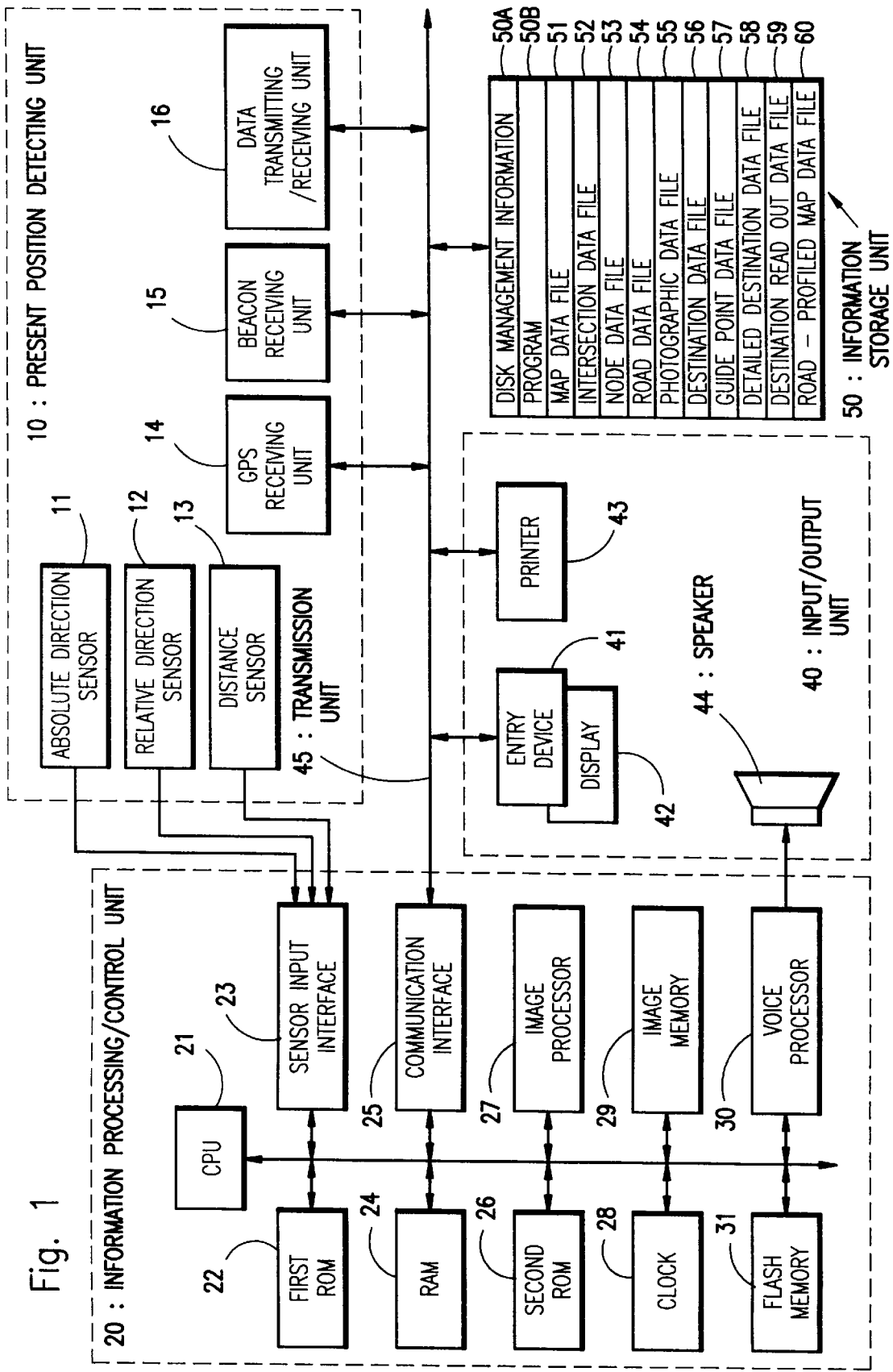
FIG. 1 is a block diagram of a navigation apparatus for a vehicle to which the present invention is applied.

As shown in FIG. 1, a navigation apparatus according to an embodiment of the present invention is designed to be installed into a vehicle, and consists of a present position detecting unit 10, an information processing/control unit 20, an input/output unit 40, and an information storage unit 50.

Particularly, in this embodiment, there are provided the present position detecting unit 10, a road-profiled map data file 60 used for displaying a road-width profile, matching means for compensating a present position and displaying the compensated position on a road, a road data file 54 which contains information about roads such as shapes and distances of roads, and means for compensating a present position in accordance with conditions of matching.

This navigation apparatus will now be described in detail.

The present position detecting unit 10 includes the following components:

An absolute direction sensor 11 is a geomagnetic sensor which detects the heading direction of a vehicle through detection of the direction of the N-pole of a magnet. The absolute direction sensor 11 may be another type of sensing means that can detect the absolute direction.

A relative direction sensor 12 detects a variation in the heading direction of the vehicle while it is turning at an intersection, for example, and may be an optical rotary sensor or a rotary-type variable resistor mounted to a rotary portion of a steering wheel, or an angle sensor attached to a wheel portion. Also, it is possible to use a gyro sensor which detects angular variations utilizing the angular velocity. That is, any sensing means which can detect variations in the relative angle with respect to a reference angle (absolute direction) may be used as the relative direction sensor 12. A distance sensor 13 is a sensor which detects the distance traveled by detecting and counting the rotation of a wheel, or a sensor which detects an acceleration and subjects the acceleration to double integration. That is, any sensing means which can measure a traveling distance of the vehicle may be used as the distance sensor 13.

A GPS (Global Positioning System) receiving unit 14 receives a signal from an artificial satellite. The GPS receiving unit 14 can obtain various kinds of information such as the transmission time of each signal, position of the receiving unit, the moving velocity of the receiving unit, and the heading direction of the receiving unit. A beacon receiving unit 15 receives signals transmitted from a transmitting apparatus disposed at a specific location. Especially, the beacon receiving unit 15 can obtain VICS information, which makes it possible to obtain information related to travel of the vehicle, such as information regarding traffic congestion, information regarding the present position, and information regarding parking lots.

A data transmitting/receiving unit 16 communicates with devices and facilities outside the vehicle using telephone and radio communication channels so as to exchange information. This is used for automobile phones, ATIS, VICS, GPS compensation, inter-vehicle communication, etc. The data transmitting/receiving unit 16 can receive and send information regarding the travel.

The information processing/control unit 20 performs various kinds of calculation and control based on both information input through the present position detecting unit 10 and the input/output unit 40 as well as information stored in the information storage unit 50, and outputs the results of calculation to output means such as a display 42, a printer 43, or a speaker 44.

The information processing/control unit 20 includes the following components:

A central processing unit (CPU) 21 performs general calculation and control for the entire navigation apparatus. A first ROM 22 stores therein programs related to navigation; specifically, various kinds of navigation programs related to detection of the present position, route determination, and display/guidance. A sensor input interface 23 receives information supplied from the present position detecting unit 10.

A RAM 24 stores therein various kinds of information input by a user through an entry device 41, which will be described later. Examples of such information include information regarding a destination and information regarding enroute points. The RAM 24 also stores the result of calculation which is performed by the CPU 21 based on the information input by the user, a determined route, and map information read out from the information storage unit 50. A communication interface 25 inputs and outputs various kinds of information. This communication interface 25 inputs information from the outside such as information supplied from the present position detecting unit 10.

A second ROM 26 stores therein various kinds of programs related to navigation, such as a navigation program for voice guidance. An image processor 27 serves as processing means for converting vector information provided by the CPU 21 to image information. A clock 28 provides clocking time. An image memory 29 serves as means for storing therein image information obtained by the image processor 27. A voice processor 30 processes voice information read out from the information storage unit 50 and outputs voice messages to the speaker 44 of the input/output unit 40. Numeral 31 denotes a flash memory.

The input/output unit 40 has an entry device 41 for inputting various kinds of data such as a destination, enroute points, and route determining conditions. The entry device 41 is a touch switch, a joystick, a key switch, or the like. The input/output unit 40 further includes the display 42 for displaying images, the printer 43 for printing information, and the speaker 44 for outputting voice.

The information storage unit 50 is connected to the information processing/control unit 20 via a transmission line 45. The information storage unit 50 stores therein disk management information 50A, a program 50B, a map data file 51, an intersection data file 52, a node data file 53, a road data file 54, a photographic data file 55, a destination data file 56, a guide point data file 57, a detailed destination data file 58, a destination read out data file 59, and a road-profiled map data file 60 used for displaying a road-width profile. Although the information storage unit 50 is generally composed of a photomagnetic recording medium such as a CD-ROM, and an IC card, the information storage unit 50 may be a magnetic recording medium such as a floppy disk.

In the navigation apparatus for a vehicle having the above-described structure, the map information stored in the information storage unit 50 is read out based on the present position detected by the present position detecting unit 10, and is displayed on the display 42. When a destination is input, a route from the present position to the destination is calculated by the information processing/control unit 20, and route guidance is provided by displaying the determined route together with the present position detected by the present position detecting unit (e.g., the GPS receiving unit 14, the relative direction sensor 12, the distance sensor 13) 10.

For example, when the vehicle is in the middle of the determined route and is away from the subsequent intersection, the driver may feel uneasy as to whether the vehicle has deviated from the proper route. Therefore, in order to make the driver know that the vehicle is on the proper route, thereby easing the driver's mind, photographic images of characteristic objects existing along the route are read out from photographic data file 55 and are displayed on the display 42. Alternatively, a guidance map is read out from the map data file 51 and is displayed together with the position of the vehicle, thereby informing the driver of the travel position on the route. When the vehicle approaches an intersection, the intersection data file 52 is accessed so as to display the intersection in the form of a graphic image.

Figure 2:
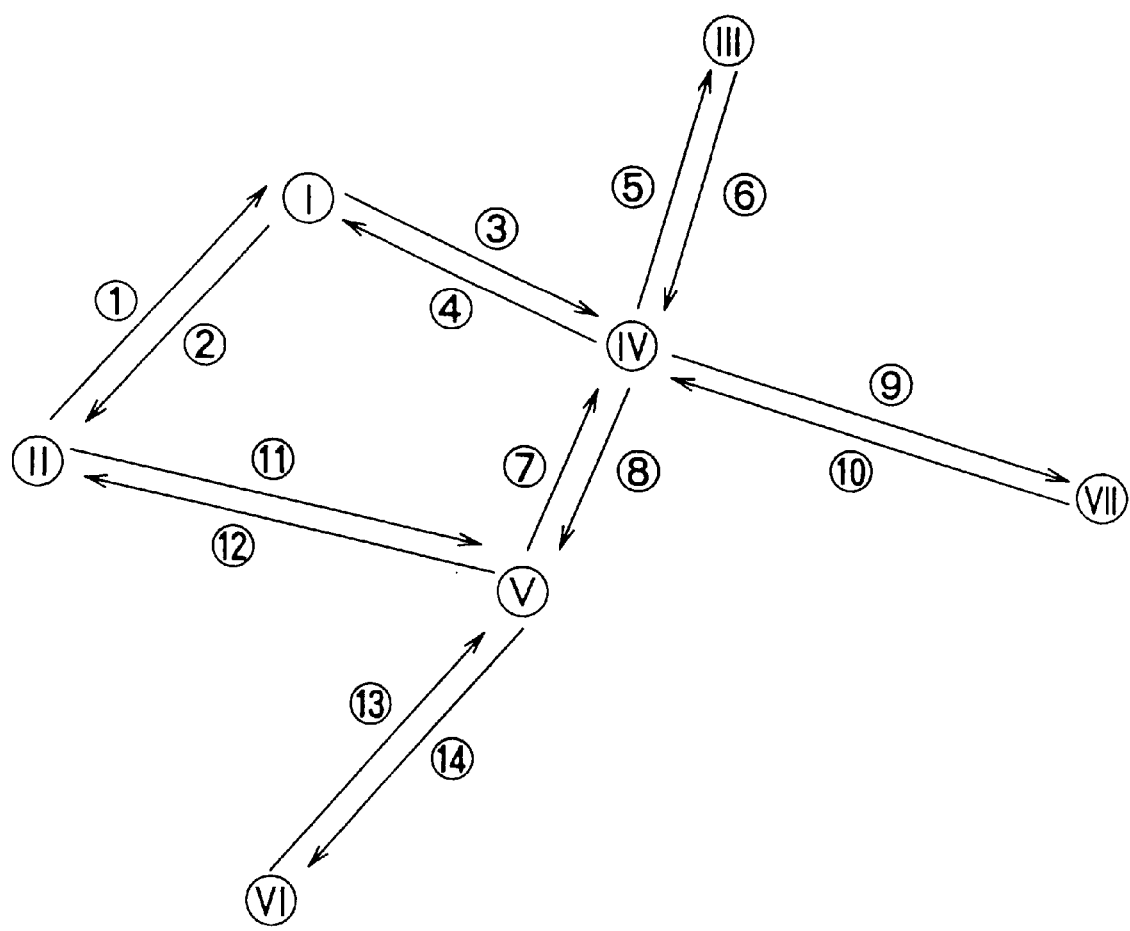
FIG. 2 is an explanatory diagram showing a road network.

When there exists a road network consisting of intersections ①–+e,crc VII+ee and roads ①–⑭, as shown in FIG. 2, the road network is defined as follows. As shown in FIG. 4, for the road ①, there are input the road number ⑪ of an adjacent road whose start point is the same as that of the road ①, and the road number ④ of another adjacent road whose end point is the same as that of the road ①. Further, in order to define the road ①, the number ⑪ of an intersection corresponding to the start point of the road ① the number ① of another intersection corresponding to the end point of the road ①, a node series pointer (A000), and the road length (1,000 m) are input. This data input is repeated for other roads, thereby defining the road network.

FIG. 3(A), 3(B) and 3(C) show the structure of data regarding an intersection for use in the navigation apparatus according to the present invention. As shown in FIG. 3(A), for each intersection there are stored the intersection number, the coordinates (longitude and latitude) of the intersection, information regarding roads connected to the intersection, and the address and size of landmark (mark pattern) data. As shown in FIG. 3(B), for each landmark, there are stored the coordinates (longitude and latitude) of the landmark, the mark pattern number, and the number of a road along which the landmark exists. (When the landmark is situated at a corner of an intersection, the road numbers of two roads are stored.)

For example, as shown in FIG. 3(C), mark pattern number "0" is assigned to graphic data for the mark of a ○○ bank, mark pattern number "1" is assigned to graphic data for the mark of a ◇◇ bank, mark pattern number "2" is assigned to graphic data for the mark of a □□ bank, mark pattern number "3" is assigned to graphic data for the mark of a ▵▵ gas station, and mark pattern number "4" is assigned to graphic data for the mark of a ▽▽ gas station.

FIG. 5(A)–5(E) show structure (1) of road data for use in the navigation apparatus according to the present invention, and FIG. 8(A) and 8(B) show structure (2) of road data for use in the navigation apparatus according to the present invention. FIG. 5(A) shows the contents of guidance road data. For each of the roads ①–⑭ shown in FIGS. 2 and 4, there are stored a length, road attribute data (see FIG. 6(A)), the address and size of shape data, and the address and size of the guidance data. As shown in FIG. 5(B), the shape data include, for example, longitude and latitude data. As shown in FIG. 5(C), the guidance data include the name of an intersection, presence/absence of a traffic signal, landmark data, data regarding a caution point, a road name, the address and size of road name voice data, and the address and size of place-to-go data.

As shown in FIG. 5(D), the place-to-go data include the road number of a road to enter, the name of a place to go, the address and size of voice data for the name of the place to go, the direction-to-go data, travel guidance data, and the like. As shown in FIG. 5 (E), the direction-to-go data include data indicating one of the following items: −1: invalid, 0: unnecessary, 1: straight, 2: rightward direction, 3: rightward direction with an angle, 4: rightward return direction, 5: leftward direction, 6: leftward direction with an angle, and 7: leftward return direction. As shown in FIG. 6(A), the road attribute data include elevated/underground data representing whether a road is elevated or is adjacent to an elevated road, or whether the road is an underground road or is adjacent to an underground road, as well as data regarding the number of traffic lanes (i.e., three or more lanes, two lanes, or one lane) or indicating the absence of a centerline.

As shown in FIG. 6(B), the road name data includes a road type and a sub-type number. Examples of the road type include a freeway, an urban freeway, a toll road, and ordinary roads such as a national road, a prefectural (state) road, and other roads. For a freeway, a main road is represented by "1", while a connection road (branch road) for connection to a subsequent road is represented by "2". Respective numbers are assigned to other types of roads.

As shown in FIG. 6(C), the caution point data include data indicating a railroad crossing, the entrance of a tunnel, the exit of a tunnel, or a road-width decreasing point, or data indicating the absence of any caution point.

As shown in FIG. 6(D), the travel guidance data include data indicating rightward offset run, leftward offset run, run at the center, or data indicating the absence of travel guidance.

Next, basic processing for navigation will be described.

Figure 7:
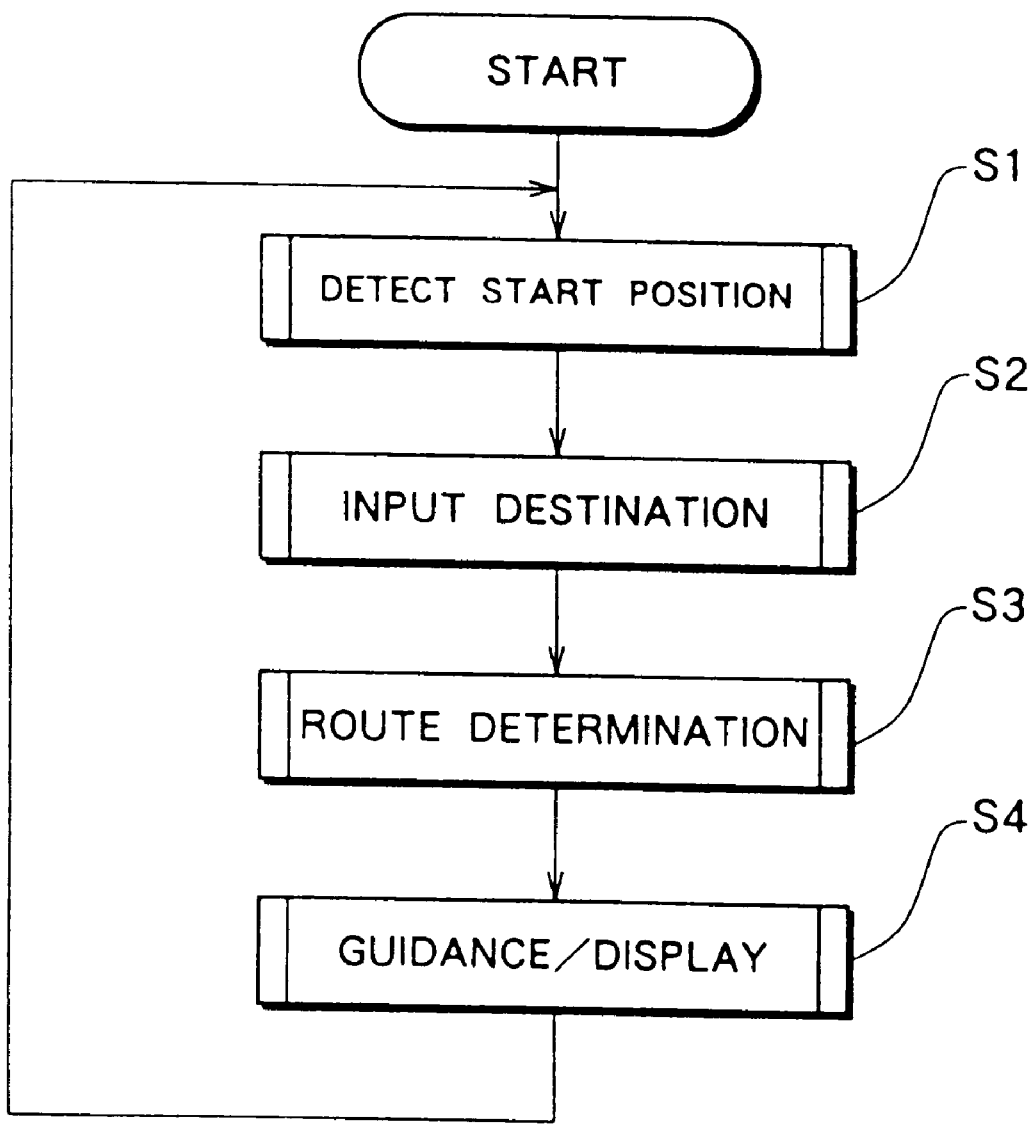
FIG. 7 is a flowchart showing the basic operation of the navigation apparatus for a vehicle of the present invention.

FIG. 7 shows a flowchart showing the basic processing for navigation according to the present invention.

First, the present position is detected based on the output from the present position detecting unit 10 (step S1). Subsequently, processing for inputting a destination is performed (step S2). The destination can be input by selecting one of destinations from a menu displayed on the display 42 through use of the entry device 41. Alternatively, the destination can be selected by inputting a telephone number.

Next, a route up to the destination is determined based on the present position detected by the present position detecting processing and the destination input through destination input processing (step S3). In detail, a node on a road closest to the input destination is calculated. A route from the present position to the calculated node is determined based on determination requirements (for example, the shortest distance, the shortest time, presence/absence of priority on a toll road, ease of traveling). Subsequently, route guidance suitable for the present position is provided based on the route determined by the route determining processing, and the present position detected by the present position detecting means (for example, a GPS, a gyro sensor, distance sensor, etc.) (step S4).

An embodiment of the present invention will now be described.

According to the present invention, a present position mark is displayed on a road-profiled map by either of the following two methods using matching data. Method 1: in addition to data used for matching processing performed for a conventional road map, matching data is prepared so that the present position mark is displayed at the center of a road on which a vehicle is traveling. Method 2: the road map and the road-profiled map share the same matching data.

In the method 1, when the present position is detected, the central processing unit determines the type of a map displayed on the display 42. Subsequently, matching data corresponding to the detected map type is selected, and the present position mark is displayed on the displayed map through use of the selected matching data.

In the method 2, a coordinate on the road map is made to correspond to that on the road-profiled map so that the same matching data is used in processing for displaying the present position mark on either map. The present position mark is displayed at the thus-obtained coordinate.

According to the method 2, the present position coordinate detected by the present position detecting means is tracked, and the obtained track of the present position is compared with the shape of a road which is included in the matching data, thereby detecting a road on which the vehicle is traveling. When the coordinate of the present position is converted to the coordinate of the detected road, the following fact must be considered: in the road map, a road which is composed of two lanes of facing traffic is represented by a single line, i.e. the coordinate of a single road. Accordingly, when the present position mark is to be displayed on the road-profiled map, the coordinate of a road contained in matching data must be made to correspond to the coordinate of a relevant road on the road-profiled map. For example, the coordinate of a road may be merely made to correspond to a median strip or a centerline of the road. However, this fails to properly display the present position mark on a road which appears on the road-profiled map. Consequently, it is difficult for a driver to recognize on which lane the vehicle is traveling.

Therefore, in the method 2, the following processing must be performed so as to properly display the present position mark on a road which appears on the road-profiled map.

First, relevant matching data is obtained through matching processing. In this case, when a road is of facing traffic, it is not definite on which lane, right or left, the vehicle is traveling. Thus, the traveling direction of the vehicle is detected, and the relevant lane is calculated based on the detected traveling direction and the obtained matching data. Subsequently, based on the thus-calculated road information, the coordinate of the present position is converted so as to display the present position mark on the relevant lane on which the vehicle is traveling.

When data regarding a road having a median strip or a centerline is stored for the road-profiled map, the data may be stored as data regarding one road which has a median strip or a centerline, or data regarding a road may be stored in the form of data regarding two different right-hand and left-hand roads which compose the road.

Next will be described the former case where the road data is stored as data regarding one road having a median strip or a centerline.

Information regarding width is stored beforehand for each road. The central processing unit detects the width of a road on which the vehicle is traveling. When the vehicle is traveling on the left-hand lane, coordinate conversion is performed such that the present position mark is shifted leftward from the center of the road by ¼ of the road width. Thus, the present position mark is displayed at a leftward position on the road.

Alternatively, information regarding coordinates of the widthwise edges of a road may be stored. The coordinate of the center of a road is obtained based on the coordinates of the widthwise edges of the road. Then, the present position mark is displayed on a line corresponding to the obtained coordinate of the center. Alternatively, coordinate conversion may be performed such that the present position mark is shifted in the widthwise direction to such an extent that the present position mark is not displayed beyond the road, and the present position mark may be displayed accordingly.

Further, information regarding one-way traffic can be stored in the information storage means. This allows roads having a similar width to be displayed in different manners, so that a driver can readily recognize a road on which the vehicle is traveling. For example, when a road on which the vehicle is traveling is judged to be a one-way road, coordinate conversion is performed so as to display the present position mark such that it moves along the center of the road. On the other hand, when the road is judged to not be a one-way road, coordinate conversion is performed in the following manner. The present position mark is displayed at a position shifted leftward by a predetermined amount from the center of the road if the vehicle is traveling on the left-hand lane of the road, or at a position shifted rightward by a predetermined amount from the center of the road if the vehicle is traveling on the right-hand lane of the road.

The CPU 21 has coordinate converting means for performing coordinate conversion in the following manner. When a road on which the vehicle is traveling is judged to be a one-way road, the coordinate of the center of the road is obtained based on the coordinates of both widthwise edges of the road. Subsequently, the present position mark is displayed on the centerline which is represented by the obtained coordinate of the center of the road. From the thus-displayed present position mark, the driver recognizes that the road is not a two-way road. On the other hand, when the road is judged to be not a one-way road, the coordinate of the center between the coordinate of the center of the road and the coordinate of the left-hand edge of the road is obtained based on these coordinates of the center and left-hand edge of the road. Then, the present position mark is displayed on a line which is represented by the obtained coordinate of the quarter point.

Also, road information may be stored for each road in the form of a series of coordinates at which the present position is to be displayed. This allows the present position mark to be reliably displayed once a road on which the vehicle is traveling is detected.

Next will be described the latter case where data regarding a road is stored in the form of data regarding two different right-hand and left-hand roads which compose the road.

Also, in this case, a series of coordinates at which the present position is to be displayed are stored beforehand for each right-hand/left-hand road. When a right-hand/left-hand road on which the vehicle is traveling is detected, the present position mark can be reliably displayed.

When information regarding width is stored for each right-hand/left-hand road, the CPU 21 searches the information regarding the width of a right-hand/left-hand road on which the vehicle is traveling, and converts the coordinate of the present position mark to the coordinate of the center of the right-hand/left-hand road. Thus, for example, when the vehicle is traveling on the left-hand road, the present position mark can be displayed at the center of the left-hand road.

Alternatively, information regarding coordinates of the widthwise edges of a right-hand/left-hand road may be stored. The coordinate of the center of a right-hand/left-hand road is calculated based on the coordinates of the widthwise edges of the right-hand/left-hand road. Then, the coordinate of the present position mark is converted to the obtained coordinate of the center of the right-hand/left-hand road, thereby displaying the present position mark at the center of the right-hand/left-hand road.

In the above-described method 2, the road map and the road-profiled map can share matching data which indicate the shapes of roads and is used for matching processing. Thus, the present position mark can be reliably displayed on a road which appears on the road-profiled map, without increasing/decreasing data capacity.

Now will be specifically described display of the present position mark of a vehicle on the road-profiled map which appears on the navigation apparatus of the present invention.

Figure 8:
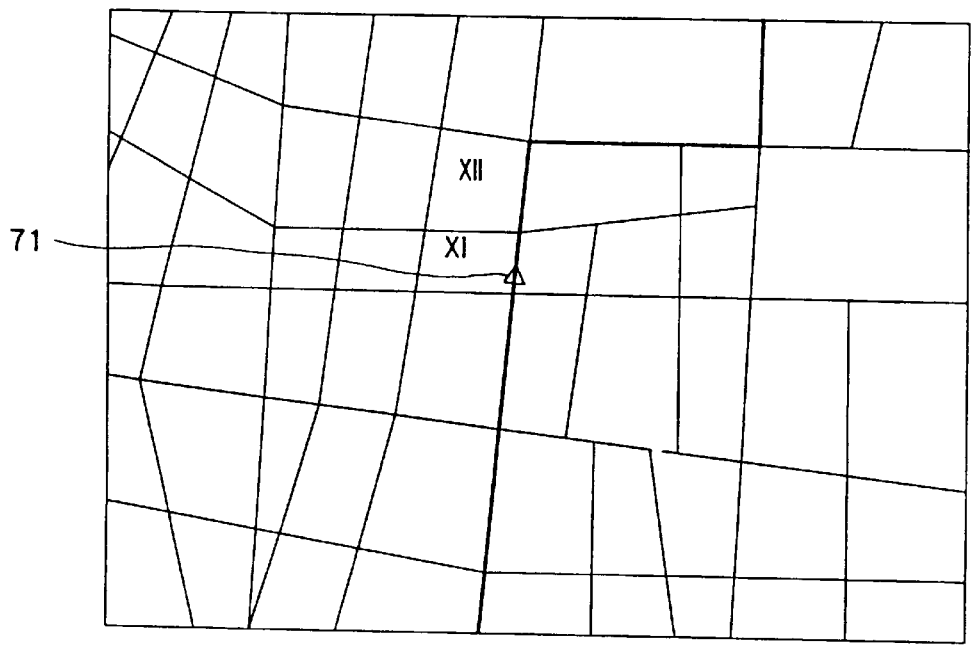
FIG. 8(A) is a view showing an example of display of a map of the navigation apparatus for a vehicle according to an embodiment of the present invention.
FIG. 8(B) is a view showing an example of display of a present position mark of the vehicle on a road-profiled map according to the embodiment of the present invention.
Figure 8:
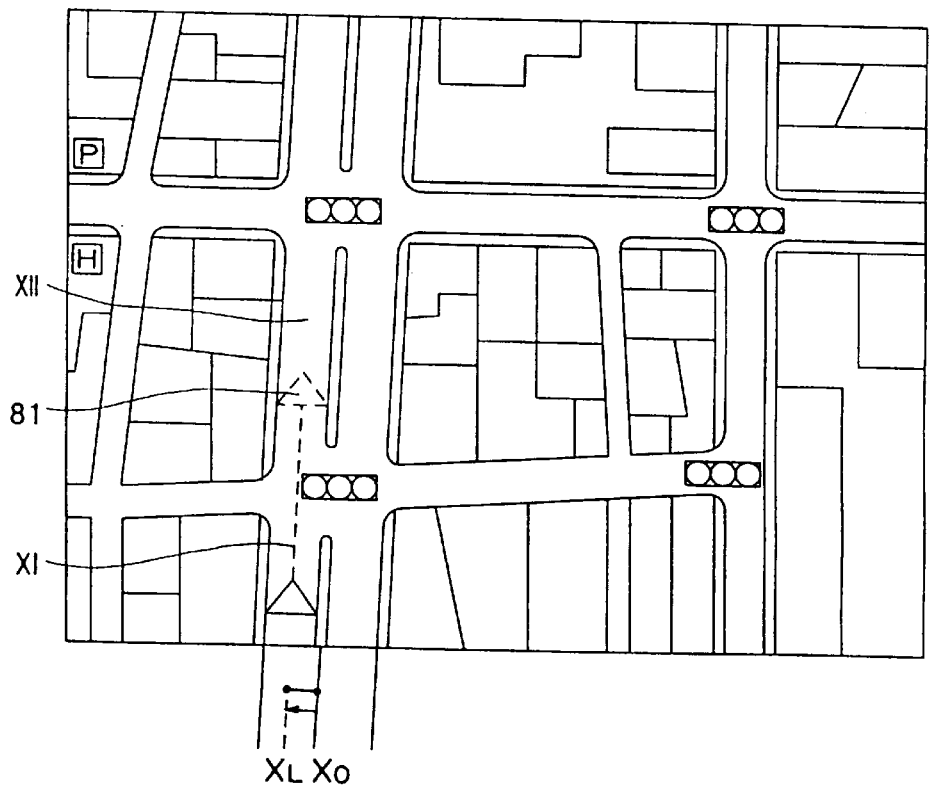
Figure 9:
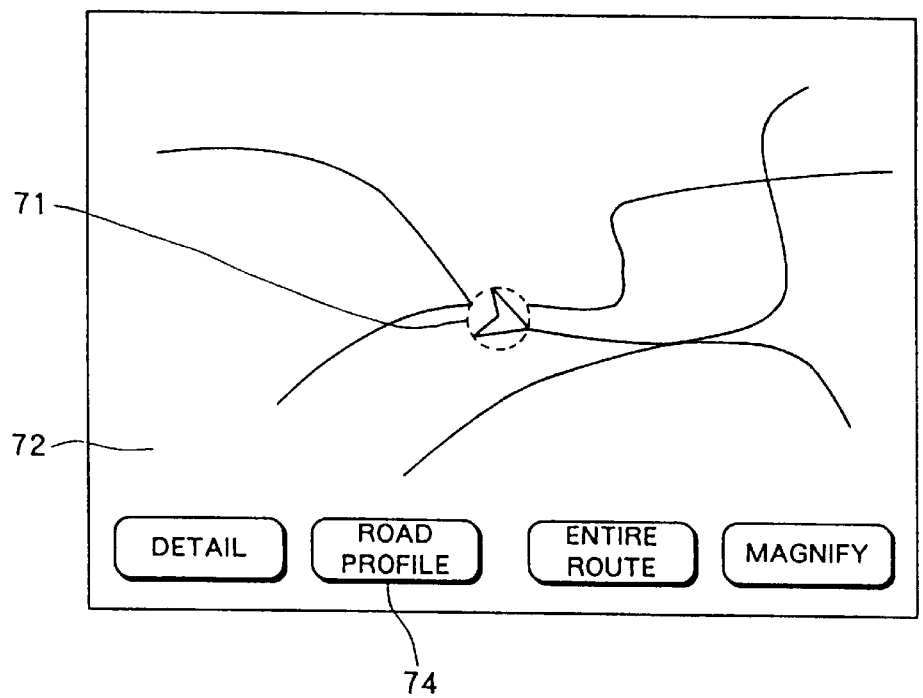
FIG. 9 is a view showing a display screen of the navigation apparatus for a vehicle according to the embodiment of the present invention.
Figure 10:
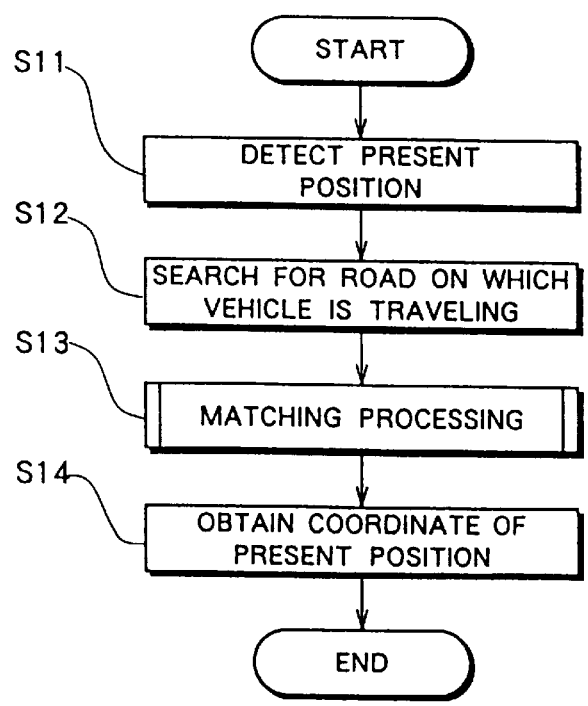
FIG. 10 is a flowchart showing processing for obtaining the present position of a vehicle for display on a road-profiled map of the navigation apparatus for a vehicle according to the embodiment of the present invention.
Figure 11:
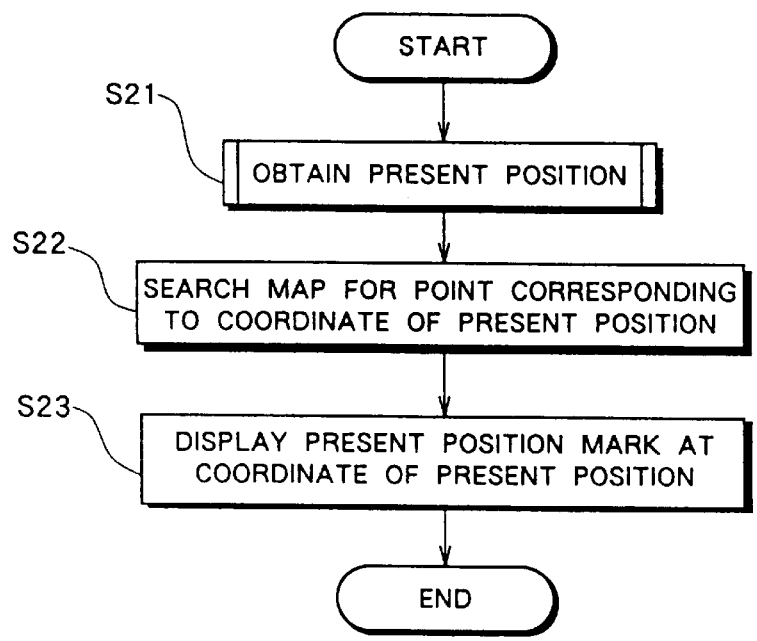
FIG. 11 is a flowchart showing processing for displaying the present position of a vehicle on the road-profiled map of the navigation apparatus for a vehicle according to the embodiment of the present invention.
Figure 12:
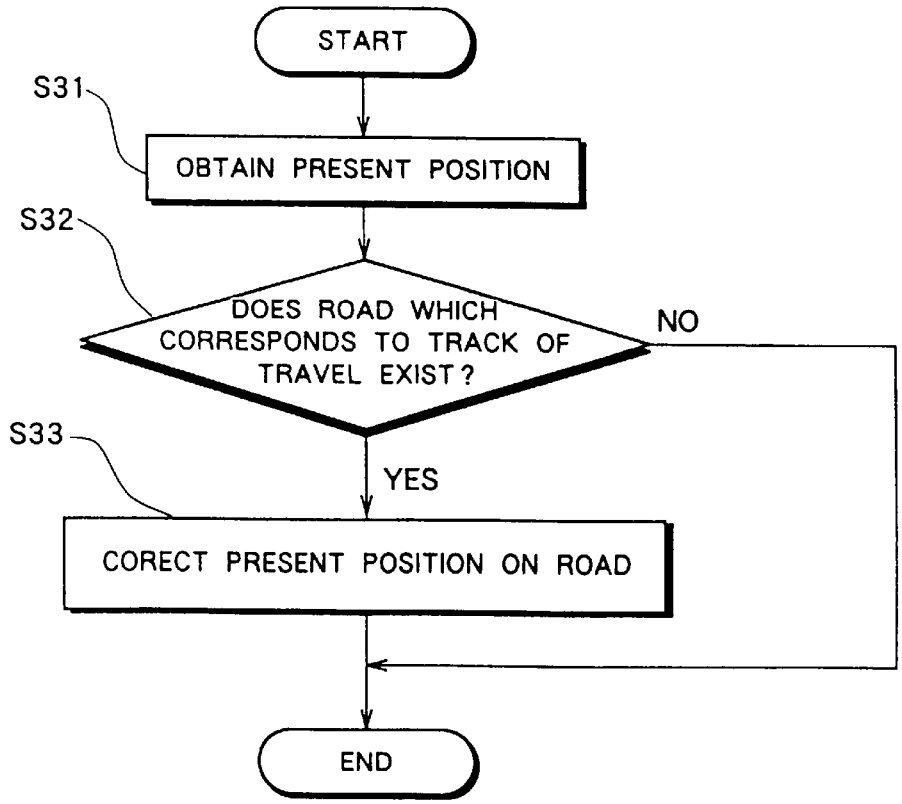
FIG. 12 is a flowchart showing matching processing for displaying the present position of a vehicle on the road-profiled map of the navigation apparatus for a vehicle according to the embodiment of the present invention.

FIG. 8 shows an example of display of the present position mark of a vehicle on the road-profiled map which appears on the navigation apparatus according to an embodiment of the present invention. FIG. 9 shows a display screen which appears on the navigation apparatus. FIG. 10 shows a flowchart showing processing for obtaining the present position of a vehicle so as to display the present position mark on the road-profiled map which appears on the navigation apparatus. FIG. 11 shows a flowchart showing processing for displaying the present position mark on the road-profiled map which appears on the navigation apparatus. FIG. 12 shows a flowchart showing matching processing which is performed in order to display the present position mark on the road-profiled map which appears on the navigation apparatus.

As described before, the vehicle is traveling toward a destination under the guidance of the navigation apparatus, and reaches, for example, a residential quarter near the destination as shown in FIG. 8(A). In this case, a road is displayed as a single line. Therefore, a mark 71 is displayed on the line indicative of the road.

Subsequently, when the vehicle approaches the destination, a screen 72 as shown in FIG. 9 is displayed on the navigation apparatus. When a driver selects a road-width profile 74 on the screen 72, data regarding a relevant road-profiled map is selected from the road-profiled map data file 60, and the road-profiled map is displayed on which a road is displayed as a plane, as shown in FIG. 8(B). Numeral 81 denotes the present position mark.

Processing for displaying the present position mark 81 will be described. First, the present position of the vehicle is obtained in accordance with the flowchart of FIG. 10. The present position of the vehicle is detected by the aforementioned method (step S11). Then, road information is searched for a road XI on which the vehicle is traveling (step S12). Subsequently, since the road XI has a two-dimensional shape, matching processing is performed for the road (step S13). Then, the coordinate of the present position of the vehicle is obtained (step S14).

Next will be described processing for displaying the present position mark of the vehicle. As shown in FIG. 11, first, the present position of the vehicle is obtained by the aforementioned method (step S21). Then, the map is searched for a point which corresponds to the coordinate of the present position (step S22). Subsequently, the present position mark is displayed at the coordinate of the present position (step S23).

The above-mentioned matching processing will now be described. As shown in FIG. 12, first, the present position of the vehicle is obtained by the aforementioned method (step S31). Then, it is checked whether or not there exists a road which corresponds to the track of travel (step S32). In this case, there exists the road XI. When YES is the case in step S32, the present position is compensated to be located on the road (step S33). Here, the road XI has a median strip, which divides the road XI into right-hand and left-hand lanes. Thus, the present position is compensated to be located on the road XI so as to correspond to the configuration of the road XI. This compensation will be described in detail later. When NO is the case in step S32, processing ends without compensating the present position to be located on the road XI.

Figure 13:
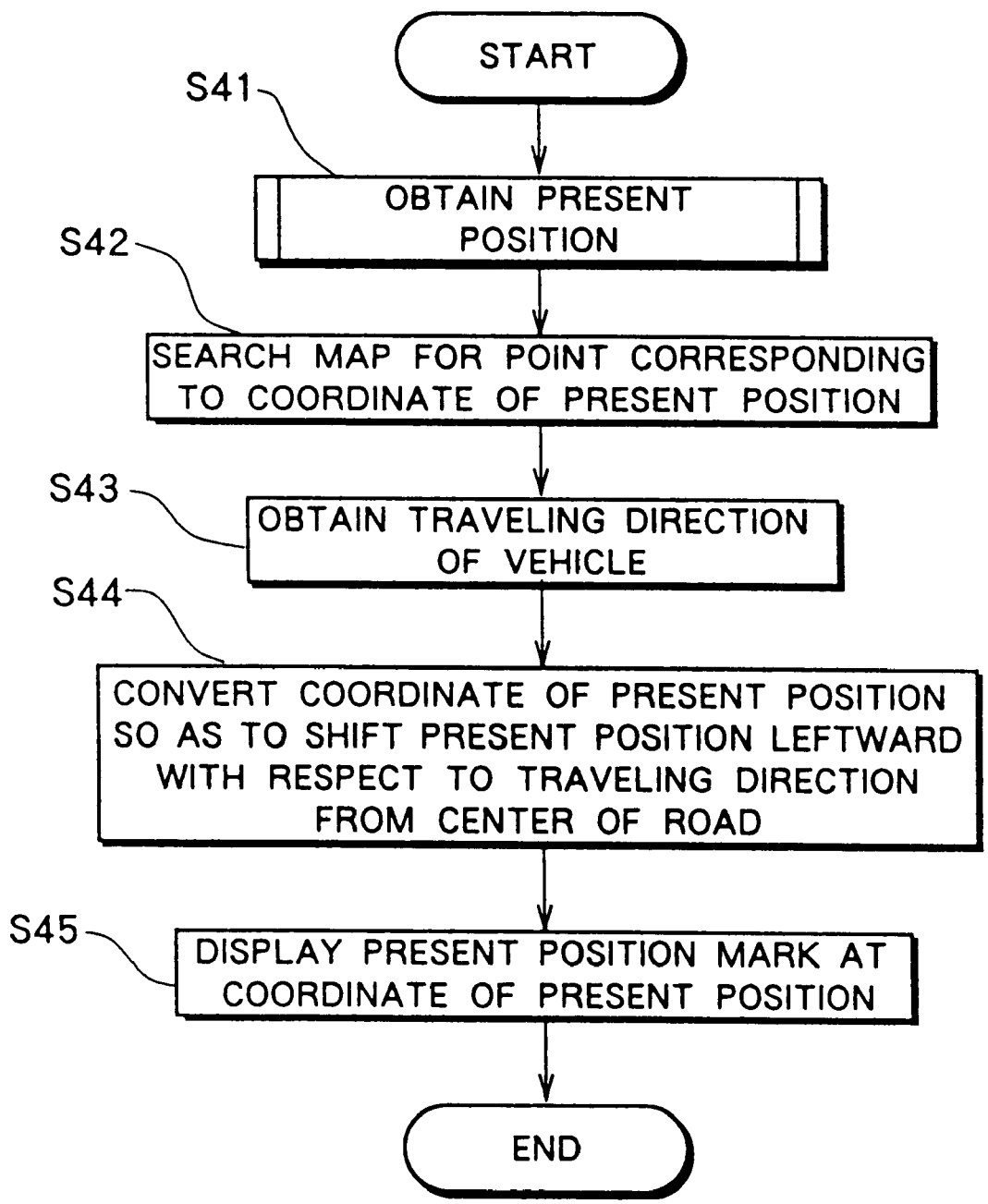
FIG. 13 is a flowchart showing display processing for displaying the present position of a vehicle (display processing for display at a rightward/leftward offset position on a road) according to the embodiment of the present invention.

FIG. 13 is a flowchart showing processing for displaying the present position mark on a road at a rightward/leftward offset position.

This offset display processing will be described with reference to FIG. 13, using a specific example of FIG. 8(B) in which the present position mark 81 is to be displayed on the road XI which is divided by the median strip into the left-hand and right-hand one-way lanes.

(1) The present position of the vehicle is obtained by the aforementioned method (step S41).

(2) The map is searched for a point which corresponds to the coordinate of the present position of the vehicle (step S42).

(3) The traveling direction of the vehicle is obtained (step S43).

(4) Coordinate conversion is performed so as to shift the coordinate of the present position leftward with respect to the traveling direction of the vehicle from the center of the road (step S44). That is, the coordinate of the present position ($X_O$) is converted to $X_L$, so that the present position is shifted from the center of the road leftward with respect to the traveling direction of the vehicle by ¼ of the width of the road. In actual processing for this coordinate conversion, the CPU 21 performs calculation as programmed in the first ROM 22 based on road information which is read into the information processing/control unit 20, namely the road data file 54, and road data and road profile data contained in the road-profiled map data file 60.

(5) The present position mark 81 is displayed on the display 42 at the converted coordinate of the present position through processing of the image processor 27 (step S45). That is, the present position mark 81 moves along the left-hand lane of the road XI. Likewise, the present position mark 81 also moves along the left-hand lane of a subsequent road XII.

Likewise, when the vehicle is traveling on the road XI in the downward direction on the road-profiled map of FIG. 8(B), coordinate conversion is performed so as to display the present position mark at a position shifted rightward by ¼ of the width of the road XI from the centerline of the road XI.

As described above, coordinate conversion is performed based on data regarding the traveling direction of the vehicle so as to display the present position mark at a position shifted from the centerline of a road either leftward or rightward by a predetermined amount.

In addition to the above-described offset display of the present position mark in the widthwise direction of a road, the present position mark may be displayed by the following methods.

(1) Matching data is prepared such that the present position comes to the center of a road on which the vehicle is traveling, and the present position mark is displayed at the coordinate of the present position. That is, the center of a road can be displayed while the vehicle is traveling.

(2) The number of lanes and the width of a road may be stored as road data in the road-profiled map data file 60. As a result, the coordinate of the present position can be converted such that the present position mark is displayed at the coordinate of the center of a lane on which the vehicle is traveling.

Next will be described a navigation apparatus according to another embodiment of the present invention which uses a structure-profiled map for providing guidance.

As shown in FIG. 1, the navigation apparatus of the present invention is composed of an input/output unit 40 for inputting/outputting information regarding route guidance, a present position detecting unit 10 for detecting information regarding the present position of a vehicle, an information storage unit 50 which contains navigation data required for calculation of a route and display/guidance data required for guidance, and an information processing/control unit 20 which performs route determination processing and display/guidance processing to provide route guidance and controls the entire system.

Each component unit of the navigation apparatus will be described below.

The input/output unit 40 allows a driver to input a destination and to instruct the information processing/control unit 20 to perform navigation processing so that the driver can receive voice and/or graphic guidance, and has a function to print out processed data and the like. In the input section of the input/output unit 40, there is provided an entry device 41 which is composed of a touch switch or an operation switch and through which a driver enters data regarding a destination in the form of a telephone number or coordinates on a map or requests the navigation apparatus for route guidance. The entry device 41 may be a remote controller or the like. In the output section of the input/output unit 40, there are provided a display 42 for displaying input data as well as route guidance in response to a driver's request, a printer 43 for printing out data which is processed by the information processing/control unit 20 and data which is stored in the information storage unit 50, and a speaker 44 for providing voice route guidance.

It is possible to add to the input/output unit 40 a voice recognition device for allowing a driver to make voice input or a card reader for reading data stored on an IC card and a magnetic card. It is also possible to add a data communication device which stores data required for navigation and which exchanges data with various information sources, such as an information center which provides information over a communication channel in response to a request from a driver, and an electronic note which stores driver-specific data such as map data and destination data.

The display 42 is composed of a color CRT or a color liquid crystal display. The display 42 displays in color navigation screens such as a route set-up screen, a section map screen, and an intersection screen, based on map data and guidance data which are processed by the information processing/control unit 20. The display 42 also displays buttons through which a driver sets a route guidance preference or switches guidance and/or screens while he/she is receiving route guidance. Particularly, information regarding an enroute intersection such as the name of an enroute intersection is displayed in color, as needed, on the section map screen in a pop-up manner.

The display 42 is installed in an instrument panel located in the vicinity of a driver's seat. A driver confirms the present position of the vehicle and obtains information regarding a route through the displayed section map. Also, when a driver touches a function button displayed on the display 42, a signal assigned to the button is generated through the input device 41, and a corresponding operation as described above is performed accordingly. This button and a touch switch compose input signal generating means which, in turn, composes the input section of the input/output unit 40, but detailed description of the means is omitted.

The present position detecting unit 10 includes a GPS receiving unit 14 which utilizes a global positioning system (GPS), a beacon receiving unit 15, a data transmitting/receiving unit 16 which receives a compensation signal for GPS by utilizing a cellular phone (mobile phone) or an FM multiplex signal, an absolute direction sensor 11 which may be an earth magnetism sensor, a relative direction sensor 12 which may be a wheel sensor, a steering sensor, or a gyro sensor, and a distance sensor 13 which detects the distance traveled through detection of the number of revolutions of a wheel.

The information storage unit 50 is an external storage unit for storing a program and data for navigation and assumes the form of a CD-ROM, for example. A program is composed of a map drawing section, a route determining section, a route guidance section, a present position calculating section, and a destination set-up operation/control section, and further includes an application section for performing signal output processing for navigation and an OS section. The information storage unit 50 contains a program for performing route determination processing, a program for controlling output display of route guidance and output of voice guidance, data required for performing such control, and display data required for displaying route guidance and a map. Data which the navigation apparatus requires is all stored in the information storage unit 50. The stored data includes a map data file 51 (a road map, a residential quarter map, a structure-profiled map, and the like), an intersection data file 52, a node data file 53, a road data file 54, a photographic data file 55, a registered point data/destination data file 56, a guide point data file 57, a detailed destination data file 58, a destination read out data file 59, and other files such as a telephone number data file and an address data file.

The information processing/control unit 20 includes a CPU (central processing unit) 21 for executing various kinds of calculations, a flash memory 31 which reads out a program from the CD-ROM of the information storage unit 50 and stores therein, a second ROM 26 used to check a program contained in the flash memory 31, a first ROM 22 which contains a program for performing renewal processing (program read out means), a RAM 24 which temporarily stores information regarding a determined route such as the coordinate of a specified destination and a road name code No. and data in process of calculation, an image memory 29 which contains image data used for displaying an image on the display 42, an image processor 27 which fetches image data from the image memory 29 based on a display control signal issued by the CPU 21 and processes the image data for display on the display 42, a voice processor 30 which processes voice information (voice data, phrase data, data regarding one sentence, sound data, and the like) read out from the information storage unit 50 based on a voice output control signal issued by the CPU 21 and converts the processed information into an analog signal so as to output voice messages to the speaker 44, a communication interface 25 for exchanging input/output data through communication, a sensor input interface 23 which receives a sensor signal supplied from the present position detecting unit 10, and a clock 28 used for writing date and time into internal dialog information. When the information processing/control unit 20 receives through the sensor input interface 23 data which has been detected by the sensors of the present position detecting unit 10, the CPU 21 calculates the coordinate of the present position at predetermined intervals of time based on the received data and writes the calculated coordinate data into the RAM 24 for temporary storage therein. While the coordinate of the present position is being calculated, map matching processing is performed with a detection error of data received from each sensor taken into consideration. Also, an output value supplied from each sensor is always subjected to compensation. A driver can select the form of route guidance received, either image or voice.

FIG. 5 shows an example of structure of road guidance data. FIG. 6(A) shows an example of structure of road attribute data. FIG. 6(B) shows an example of structure of road name data. FIG. 6(C) shows an example of structure of caution point data. FIG. 6(D) shows an example of structure of travel guidance data.

Figure 14:
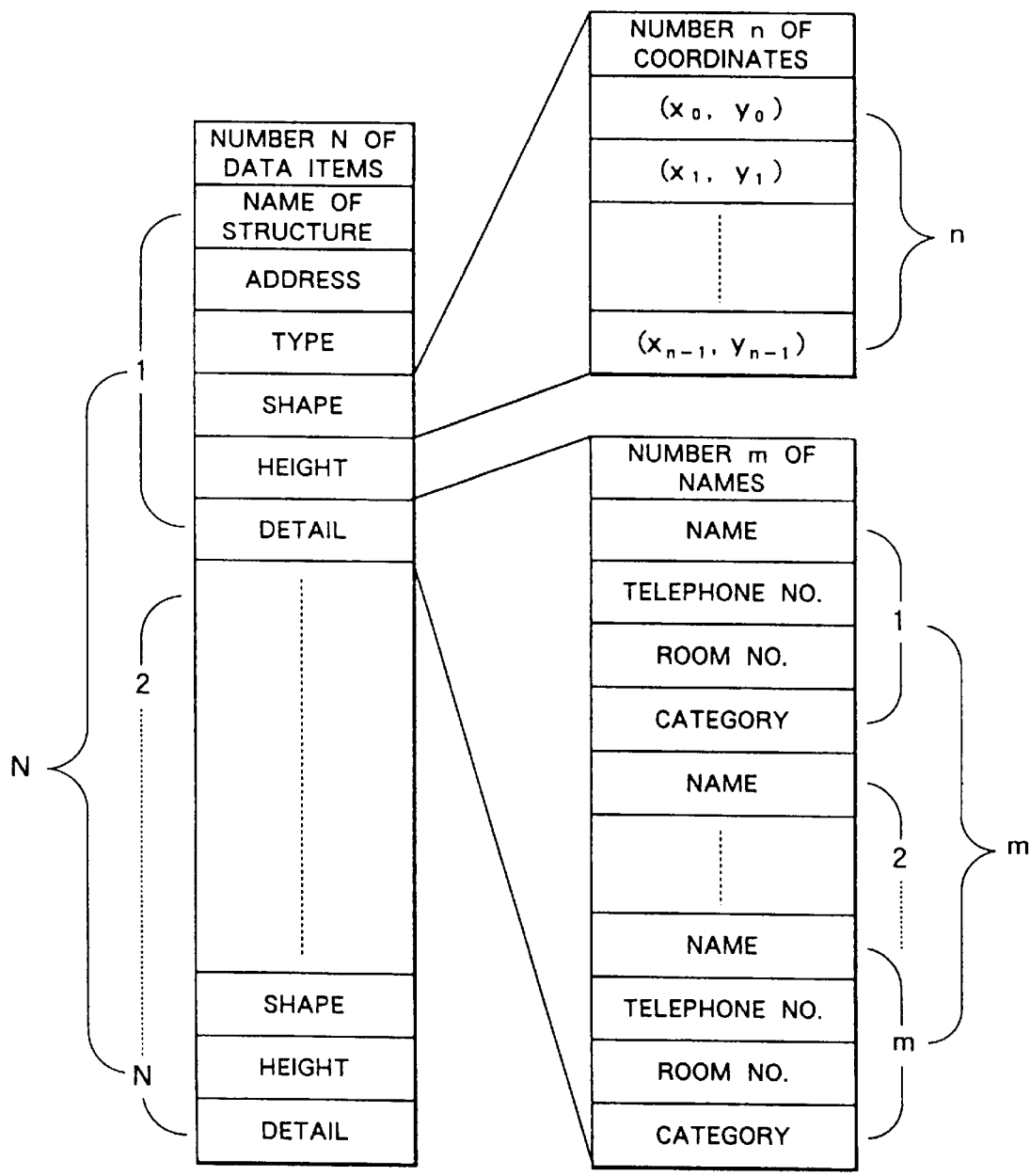
FIG. 14(A) is a diagram showing an example of the structure of structure-profiled map data.
FIG. 14(B) is a diagram showing the displayed shape of a structure which is drawn by sequentially reading out coordinates as information regarding the shape of a structure and connecting them.
Figure 14:
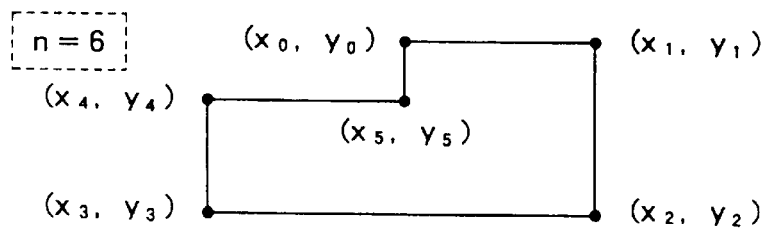

FIGS. 5, 6, and 14 show examples of structure of major data files stored in the information storage unit 50. As shown in FIG. 5(A), a guidance road data file contains for each of n roads a road number, a length, road attribute data, the address and size of shape data, and the address and size of guidance data. The guidance road data is used for providing route guidance which is obtained through route determination.

The road number is assigned to each road between branch points for each of two ways of the road. The road attribute data provides auxiliary information about road guidance. As shown in FIG. 6(A), the road attribute data include elevated/underground data representing whether a road is elevated or is adjacent to an elevated road, or whether the road is an underground road or is adjacent to an underground road, as well as data regarding the number of traffic lanes.

As shown in FIG. 5(B), the shape data include coordinate data indicative of longitude and latitude for each of m nodes by which each road is divided. As shown in FIG. 5(C), the guidance data include the name of an intersection (or a branch point), data regarding a caution point, road name data, the address and size of road name voice data, and the address and size of place-to-go data.

As shown in FIG. 6(C), the caution point data, which is one of subcategories of the guidance data, include data indicating a railroad crossing, the entrance of a tunnel, the exit of a tunnel, or a road-width decreasing point, or data indicating the absence of any caution point. The caution point data are used for calling a driver's attention when the vehicle approaches a caution point such as a railroad crossing and a tunnel. As shown in FIG. 6(B), the road name data includes a road type and a sub-type number, which indicates a sub-type for each road type. Road types indicated by the road type data include a freeway, an urban freeway, a toll road, and ordinary roads (a national road, a prefectural (state) road, and other roads). The sub-type number data indicates whether each of a freeway, an urban freeway, and a toll road is a main road or a connection road. As shown in FIG. 5(D), the place-to-go data include the road number of a road to enter, the name of a place to go, the address and size of voice data for the name of the place to go, the direction-to-go data, and travel guidance data.

As shown in FIG. 5(E), the direction-to-go data, which is one of subcategories of the place-to-go data, include data indicating one of the following items: invalid (the place-to-go data is not used), unnecessary (no guidance is provided), straight, rightward direction, rightward direction with an angle, rightward return direction, leftward direction, leftward direction with an angle, and leftward return direction. As shown in FIG. 6(D), the travel guidance data indicate which lane to take when there exist a plurality of lanes, and include data indicating rightward offset run, leftward offset run, run at the center, or data indicating the absence of travel guidance.

As shown in FIG. 14(A), data regarding a structure-profiled map include, for example, the number N of data items regarding structures, which include structure(s), bridge(s), tower(s), park(s), playground(s), and road(s), followed by data regarding each structure. Data regarding each structure include data indicating the following items: name of structure, address, type, shape, height, and detail. The "name of structure" data indicates one of the following items: the name of a building when the structure is a building, the name of a person who lives in a house when the structure is a private house, the name of facilities when the structure is facilities, and the type or name of a road such as "Chuodori Avenue" and "National Road No. 1" when the structure is a road. The "address" data indicates the address of the structure. The "shape" data include data indicating the following items: the number n of coordinates indicating a shape, and individual coordinates $(x_0, y_0), (x_1, y_1), \ldots, (x_{n-1}, y_{n-1})$. The "type" data include data indicating the following items: an ordinary house, an apartment house, an office building, public facilities, a road, a park, and the like. The "height" data indicates the number of stories or height (m). When a structure is a tenant building, for example, the "detail" data include the following data items regarding tenants: the number m of names and data items regarding each tenant such as name, telephone number, room number, and category (type of business such as family restaurant, convenience store, etc. and description of business). As shown in FIG. 14(B), data regarding the shape of a structure, i.e. coordinate data are read out, and read coordinates are connected with a line so as to display the shape of each structure such as the planar shapes of a building and a house and the plane topography of a park. Data regarding a road can also be stored in the form of data which gives a shape to the road. Data indicating a road sign such as a sign indicative of inhibition of entry and a sign indicative of one-way traffic, data indicating a road name, and data indicating an area name such as a town name may be stored as independent data or may be stored as data belonging to the road data. Data indicating a road sign such as a sign indicative of inhibition of entry and a sign indicative of one-way traffic include data indicating coordinates of a position of display of the sign and data indicating an angle of display of the sign. Likewise, data indicating a road name, a town name, or the like may also include similar data.

Next will be described operation of the navigation apparatus according to another embodiment of the present invention.

Figure 15:
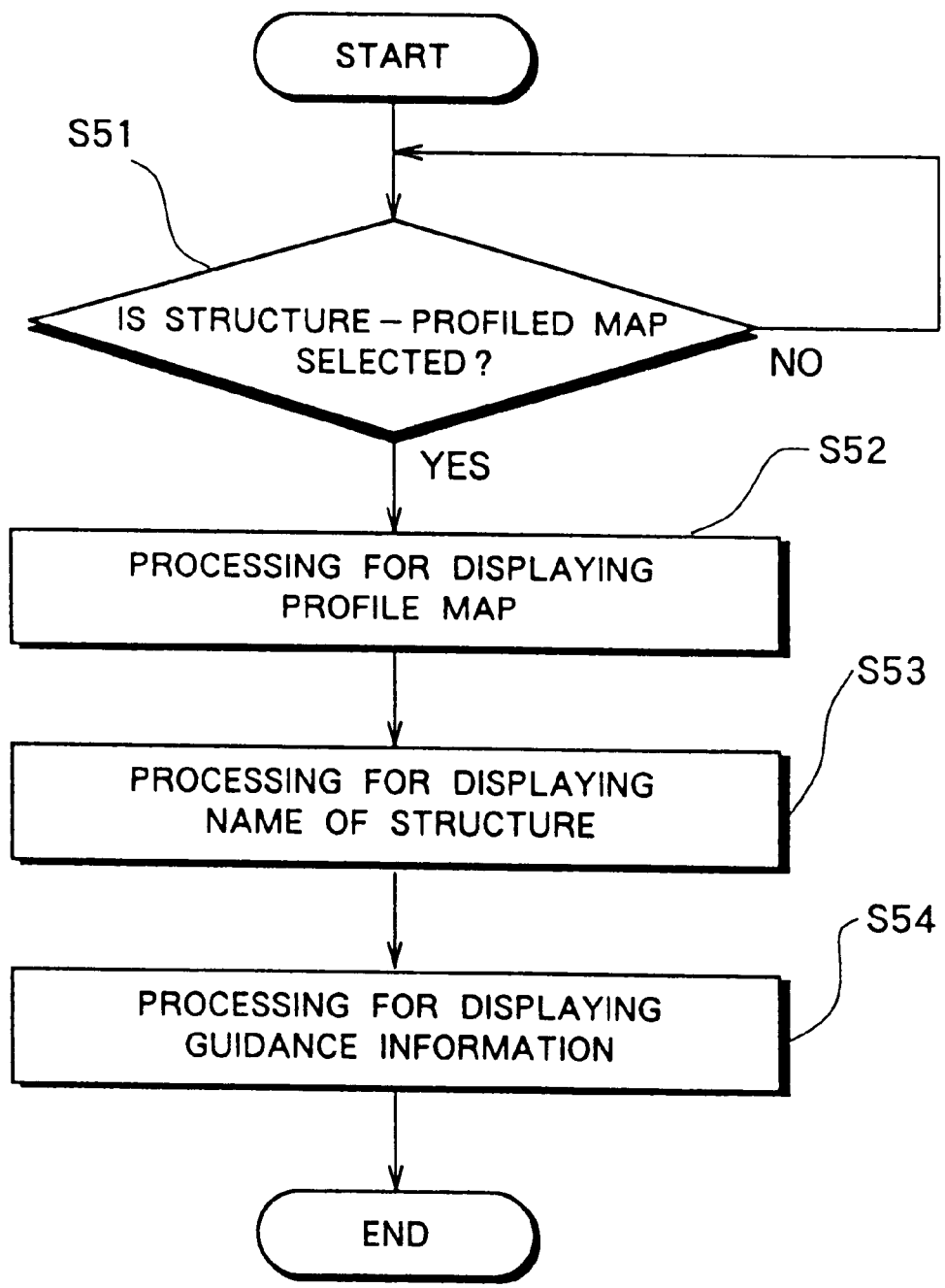
FIG. 15 is a flowchart showing display processing for displaying a structure-profiled map.
Figure 16:
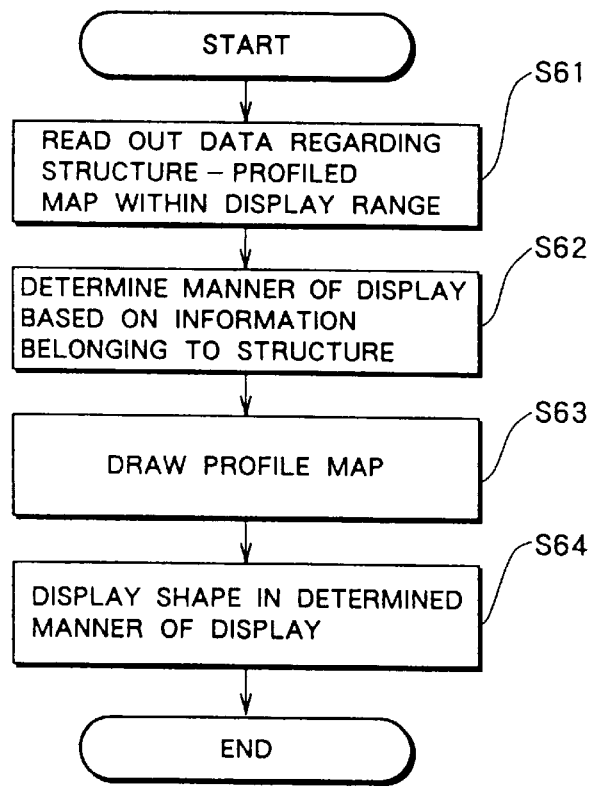
FIG. 16(A) is a flowchart showing display processing for displaying the shapes of structures.
FIG. 16(B) is a diagram showing a manner-of-display determination table.
FIG. 16(C) is a flowchart showing determination processing for determining a manner of display.
Figure 16:
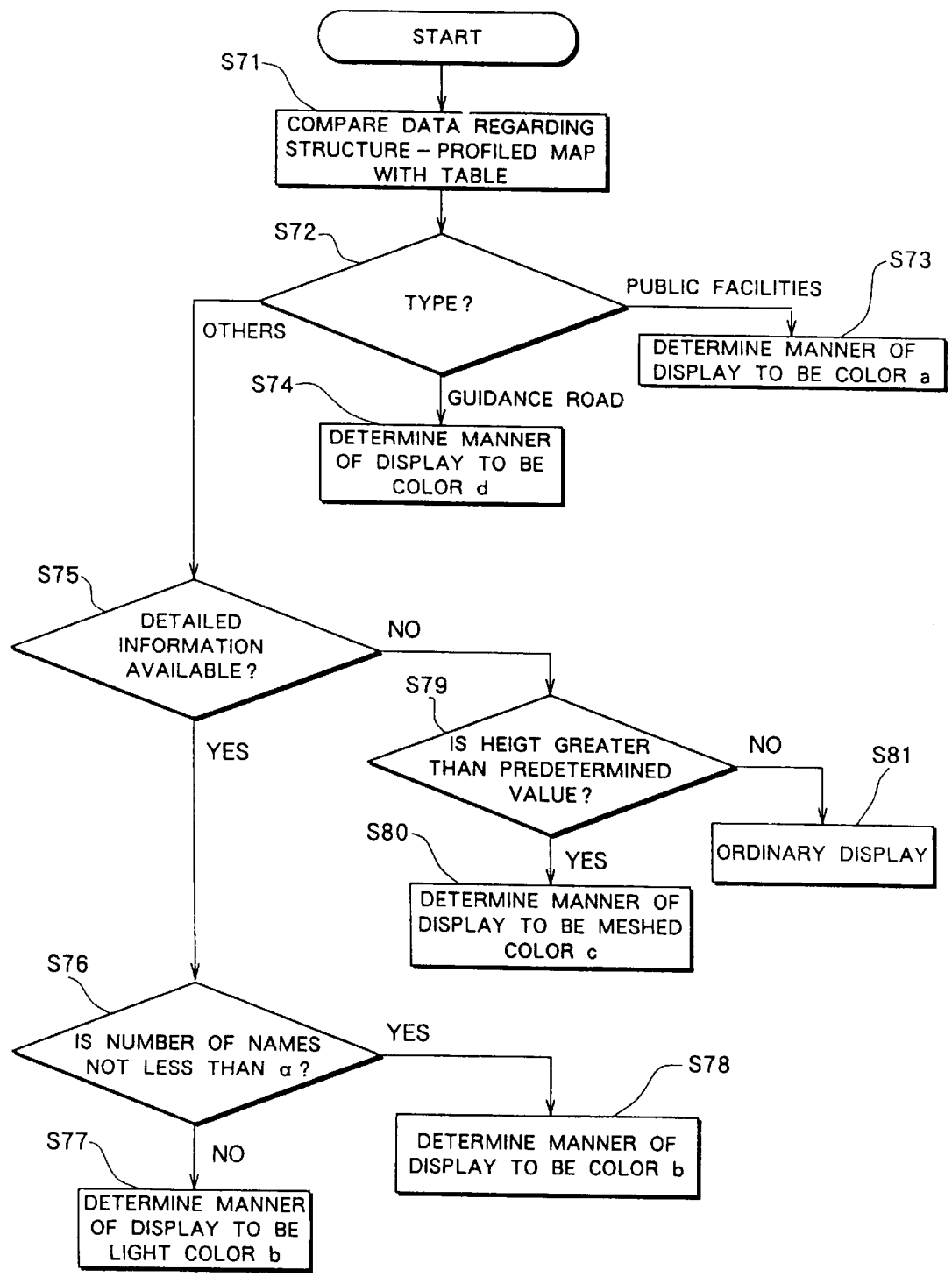
Figure 17:
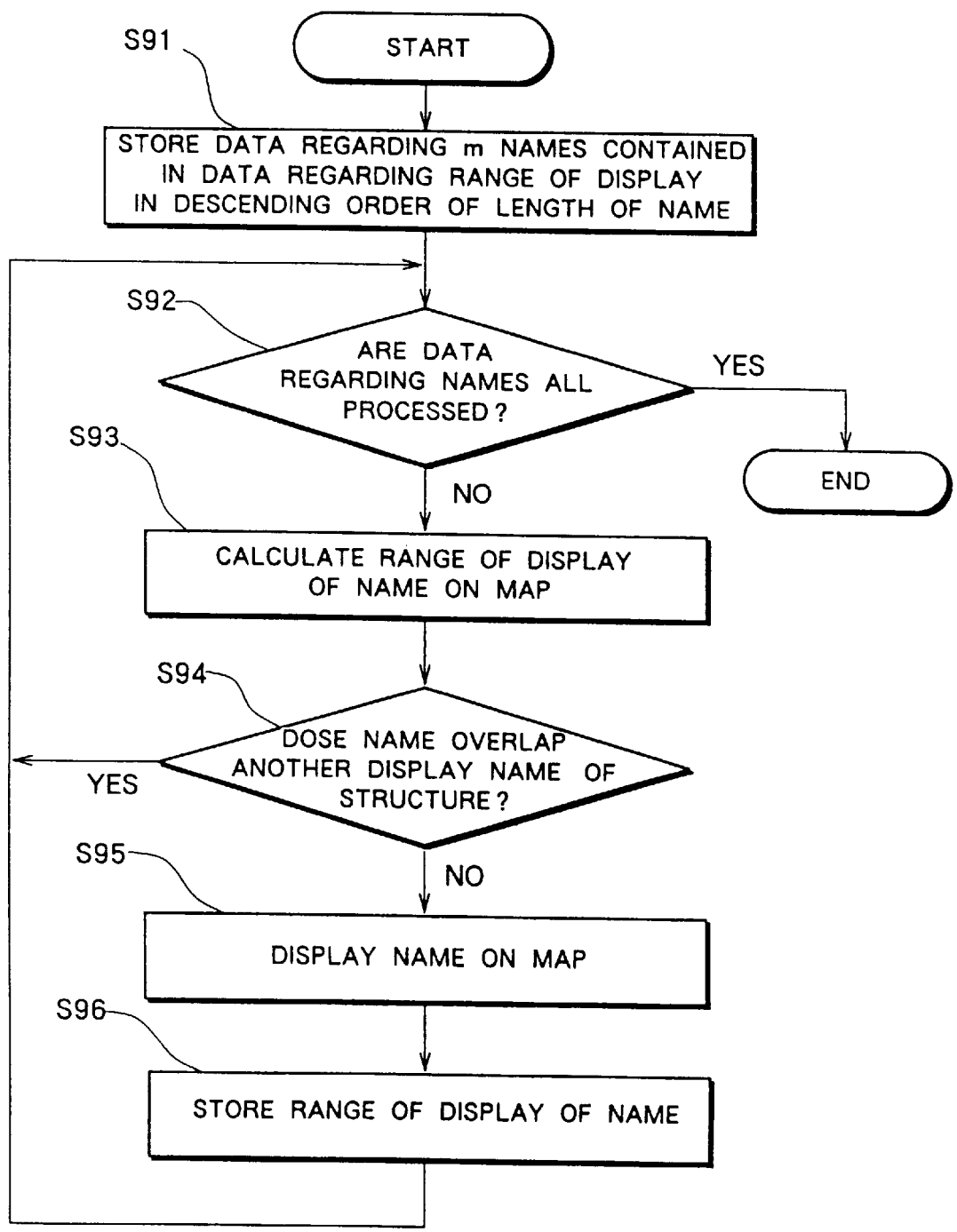
FIG. 17 is a flowchart showing display processing for displaying the name of each structure.
Figure 18:
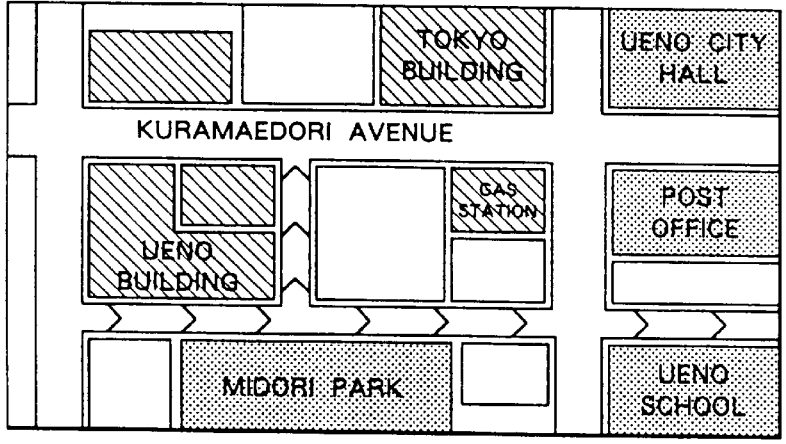
FIG. 18(A) is a view showing an example of display of a structure-profiled map while a vehicle is parked.
FIG. 18(B) is a view showing an example of display of the structure-profiled map while information other than that regarding a road is deleted.
FIG. 18(C) is a view showing an example of display of the structure-profiled map while a route, a present position mark, a landmark at a guidance intersection, and a one-way mark are displayed on the structure-profiled map in which information other than that regarding a road is deleted.
Figure 18:
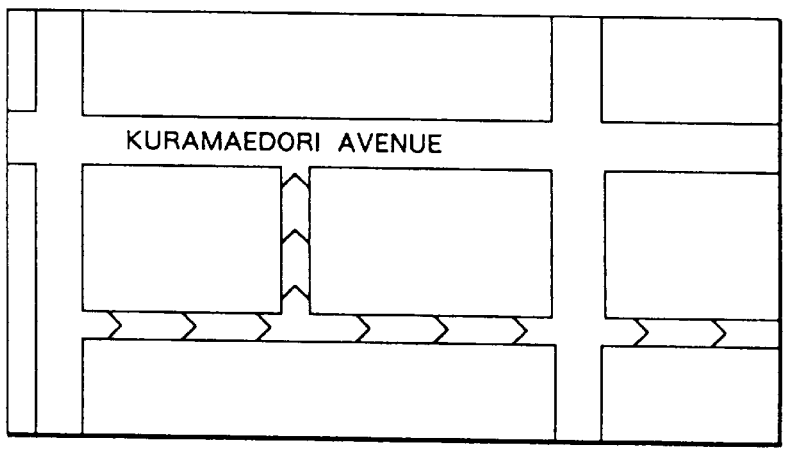
Figure 18:
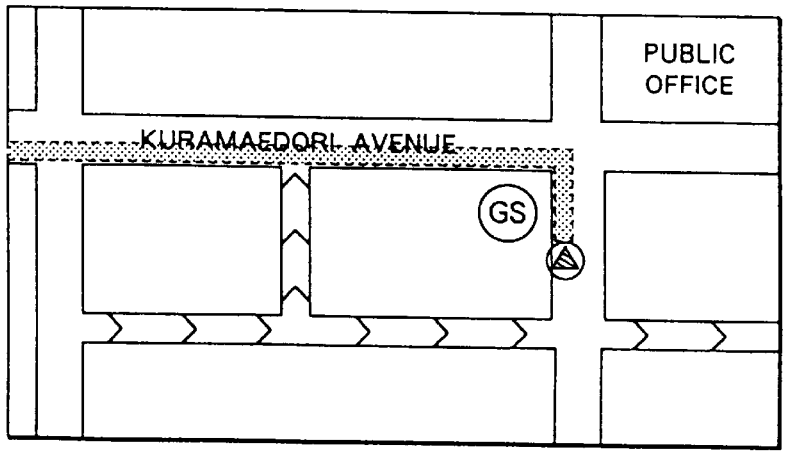

FIG. 7 shows a flow of operation of the entire system of the navigation apparatus according to the present invention. FIG. 15 shows display processing for displaying the structure-profiled map. FIG. 16 shows display processing for displaying the shape of a structure. FIG. 17 shows display processing for displaying the name of a structure. FIG. 18 shows examples of display of the structure-profiled map.

As shown in FIG. 7, when the CPU 21 of the information processing/control unit 20 starts a program of a route guidance system, first, the present position detecting unit 10 detects the present position, and the system displays an area map at the center of which the present position is located and on which the name of the present position and the like are displayed (step S1). Subsequently, the information processing/control unit 20 instructs a driver to input data regarding the destination such as a telephone number, an address, name of facilities, a registered point, or the like (step S2). Subsequently, a route from the present position to a destination is determined (step S3). When the route is determined, route guidance/display is repeated until the vehicle reaches the destination while the present position is being tracked (step S4). When the driver inputs data regarding detour before the vehicle reaches the destination, the route guidance system sets up a search area, determines a route to the detour point, and repeats route guidance/display until the vehicle reaches the detour point.

There are provided judging means for judging whether a predetermined requirement is met and switching means for switching a map to another map when the predetermined requirement is met. Thus, a driver can manually switch a displayed map to another map at desired timing. For example, when a driver wants to take a detour while the vehicle is traveling along a determined route and a road map is displayed, the route guidance system allows the driver to switch the road map to an area map which contains detailed information about desired facilities and the vicinity of the facilities. Thus, the driver can quickly obtain information regarding the following items: the position of desired facilities, the position of a parking lot, a one-way road in the vicinity of the facilities, and the like. Therefore, the vehicle can reach the detour point without fail.

In the above-described processing, the road map or the structure-profiled map is displayed as adequate at each of the following steps: inputting/confirming/setting a point of place such as the present position and a destination, confirming a determined route, and providing route guidance. Next will be described display processing for displaying the structure-profiled map using data which have been described above with reference to FIG. 14.

As shown in FIG. 15, when the structure-profiled map is selected in a map display mode (step S51), display processing is executed for displaying a profile map (step S52). Subsequently, display processing is executed for displaying the names of structures on the profile map (step S53). Then, the present position mark and guidance information are displayed (step S54). Each structure is displayed in the following shape: a planar shape for an ordinary house, a building, and other similar buildings, and a plane topography for a park and a road. In the case of a building where there exist many tenants, although the building is represented in a single shape, many kinds of information regarding tenants are included. Therefore, in step S52 for displaying the profile map and step S53 for displaying the name of a structure, the shapes of a structure having many information items and public facilities are displayed in a manner different from that of an ordinary house, so as to readily recognize such a structure and public facilities. Moreover, the name of such a structure or public facilities is displayed preferentially. When the name is different from a driver-specified name, the name is not displayed. A higher priority is given to the name of a town and the name of public facilities. Thus, names of structures are displayed in the order of the name of a town, the name of public facilities, and the name of a structure having many intra-structure information items.

Display processing for displaying the shape of a structure is performed in the following manner. As shown in FIG. 16(A), data regarding the structure-profiled map within a specified display range is read out from the information storage unit 50 (step S61). A manner of display is determined for the shape of a structure to be displayed (step S62). The manner of display includes the color of a shape, density of a color, and the pattern of display, and is determined based on the type, height, and scale of a structure. For example, the manner of display is differentiated among the following types of structures: public facilities, a station, a theater, an art museum, an amusement park, a tower, an apartment house, a building other than an ordinary house. Further, in the case of public facilities, the mode of display may be differentiated between a public organization (a government office, a police station, and a public hall) and a public field (a park and a playground). In the case of building other than ordinary houses, the manner of display may be differentiated in accordance with height (number of stories), the number of tenants, or the like. After the manner of display is determined, the structure-profiled map is displayed (step S63). Subsequently, the shape of each structure is displayed in the determined manner of display (step S64).

The manner of display which is determined in step S62 is determined in the following manner. For example, as shown in FIG. 16(B), a manner-of-display determination table as shown in FIG. 16(B) is registered. The manner of display can be determined by referencing data regarding the structure-profiled map to be displayed as well as this manner-of-display determination table. The manner-of-display determination table of FIG. 16(B) is prepared as follows. Public facilities are displayed in color a, and a guidance road is displayed in color d. A structure which is neither public facilities nor a road and which has detailed information is displayed in color b and in a dark or light shade of the color in accordance with the scale of the structure. Further, when the height of a structure is greater than a predetermined value, the structure is displayed in a mesh of color c. As described above, in this example, the manner of display includes the color of a shape, density of a color, and the pattern of display. When this manner-of-display determination table is used, the following processing is performed in step S62.

As shown in FIG. 16(C), first, data regarding a structure-profiled map is compared with the manner-of-display determination table (step S71) in order to check the type of a structure to determine whether the structure is public facilities, a road, or others (step S72). When the structure is public facilities, the manner of display is determined to be color a (step S73). When the structure is a road and the road exists on a determined guidance route (guidance road), the manner of display is determined to be color d (step S74). As described before with reference to FIG. 5, since the determined route has guidance road data, the guidance route which has a width corresponding to the number of lanes is superimposed on a map based on the guidance road data. When the structure is another structure which is neither public facilities nor a road, it is checked whether or not detailed information is available (step S75). When detailed information is available, it is checked whether or not the number of names, which is contained in detailed information, is not less than $\alpha$ (step S76). When the number of names is not less than $\alpha$, the manner of display is determined to be color b (step S78). On the other hand, when the number of names is less than $\alpha$, the manner of display is determined to be light color b (step S77). When detailed information is not available, it is checked whether or not data indicating height of the structure is greater than a predetermined height (step S79). When height of the structure is greater than the predetermined height, the manner of display is determined to be meshed color c (step S80). If, in step S79, judgment is NO, the structure will be displayed in an ordinary manner.

In this example, the manner of display is determined as follows. A top priority is given to whether or not a structure is public facilities. Next comes detailed information, i.e. the scale of a structure. Last comes height.

The name of a structure to be displayed on the structure varies in length. It may be difficult to display the entire name in the case of a certain size of a screen or a certain display range. As in the case of determining the manner of display as described above, for example, the length of a name to be displayed is determined according to priority regarding the type of a structure and priority according to detailed information, thereby preventing a displayed name from overlapping another displayed name. An example of this processing is shown in FIG. 17. First, data regarding m names which are contained in detailed information which, in turn, belongs to data regarding a range of display are stored in the descending order of name length (step S91). Subsequently, it is checked whether or not data regarding m names are processed in the descending order of length of a name (step S92). A range of display on a map is calculated for a name to be displayed (step S93). A name which is judged to not overlap an already displayed name (step S94) is displayed on the map (step S95). Subsequently, the range of display is stored (step S96). Then, processing returns to step S92 to repeat the same operation.

The range of display of a name is determined based on the vertical and horizontal size of a single character, a character pitch, and the number of characters and is positioned such that it extends sideward while its center is positioned at the center of a structure. So, the name is stored with the coordinates of upper left and lower right of a character string. When the range of display of a name is determined only based on the vertical and horizontal size of a character and a character pitch, names will be displayed adjacently to each other throughout a map while only a small clearance is left between adjacent displayed names. This makes the map difficult to view even though adjacent ranges of display do not overlap each other. Thus, adjacent ranges of display may be determined to not overlap each other when they are spaced a predetermined distance more than the above-mentioned adjacent nonoverlapping ranges of display. For example, the range of display may be defined to include a character string and a space which is equivalent to a times the size of a character and which exists on each of the upper and lower sides of the character string and a space which is equivalent to β times the size of a character and which exists on each of the right and left sides of the character string. Alternatively, the range of display may be defined to include a character string and a space which is equivalent to a predetermined number of characters and which exists on each of the upper and lower sides of the character string and a space which is equivalent to the predetermined number of characters and which exists on each of the right and left sides of the character string. Further, types of names include not only a character string but also a mark used commonly on a map in order to indicate a school, a hospital, a post office, or the like, a service mark, a string of various other types of characters, and a pattern.

As described above, data regarding a structure-profiled map used in the present invention allows the following calculation. That is, the coordinates of the center of a name to be displayed and the coordinates indicating the range of display of the name can be calculated based on a series of coordinates indicating the shape of a structure. Accordingly, it is possible to display another map which is stored, together with the structure-profiled map, in the information storage unit 50, and to display a name which is stored as part of data regarding the structure-profiled map such that the name is displayed on this displayed map within the range of display which is calculated based on a series of coordinates indicating the shape of a structure. In this case, display processing for the map and display processing for the name can be executed completely independent of each other, and an offset of display between the displayed map and the displayed name can be avoided by matching the coordinates of display between the map and the name. As a result of such a combination of processings, a string of coordinates indicating a shape and a name which are stored part of data regarding a structure-profiled map can be used as data for displaying a name on another map. Thus, the quantity of data can be greatly reduced.

FIG. 18(A)–18(C) show an example of display of a structure-profiled map. FIG. 18(A) shows an example of display of the structure-profiled map while the vehicle is parked. FIG. 18(B) shows an example of display of the structure-profiled map while information other than that regarding a road is deleted. FIG. 18(C) shows an example of display of the structure-profiled map while a route, the present position mark, a landmark at a guidance intersection, and a one-way mark are displayed on the structure-profiled map in which information other than that regarding a road is deleted. In FIG. 18(A), the name of a park, the name of public facilities, and the name of a road are displayed as names of structures. Further, some structures are displayed in different patterns, i.e. in different manners of display. In the case of display in color, discriminatory display is possible by combining colors, color density, and display patterns. Thus, the manner of display is varied in accordance with data indicating the type of a structure, data indicating height of a structure, and data indicating the number of names which are included in data indicating details of a structure. For example, a manner of display different from an ordinary manner of display may be used for public facilities such as a school, a city hall, a post office, and a station, a structure such as a park which can be recognized as a common landmark, and a tenant building for which a large number of names are stored. As a result, a driver can readily recognize a landmark in a displayed area and the features of the displayed area. FIG. 18(B) shows an example of display of a structure-profiled map wherein a structure-representing shape is displayed in a limited manner. FIG. 18(C) shows an example of display of a structure-profiled map wherein the structure-profiled map of FIG. 18(B) contains additional information displayed in the following manner: information regarding a road such as a one-way mark is highlighted, a route is displayed, and a landmark is displayed. These examples will be described later in detail.

When a structure-profiled map is displayed in an ordinary mode, the above-described processing is performed. However, when a structure-profiled map is displayed as route guidance while the vehicle is traveling, it will be difficult for a driver to find out information required for driving because too much information is displayed on the map. Particularly, when the vehicle is traveling faster than a certain speed, it is difficult for a driver to recognize information appearing on the map even though a map is displayed. Thus, when a structure-profiled map is displayed on a guidance screen, the map must be displayed such that a driver can instantaneously identify and recognize guidance information. An example of display of the guidance screen will be described below.

Figure 19:
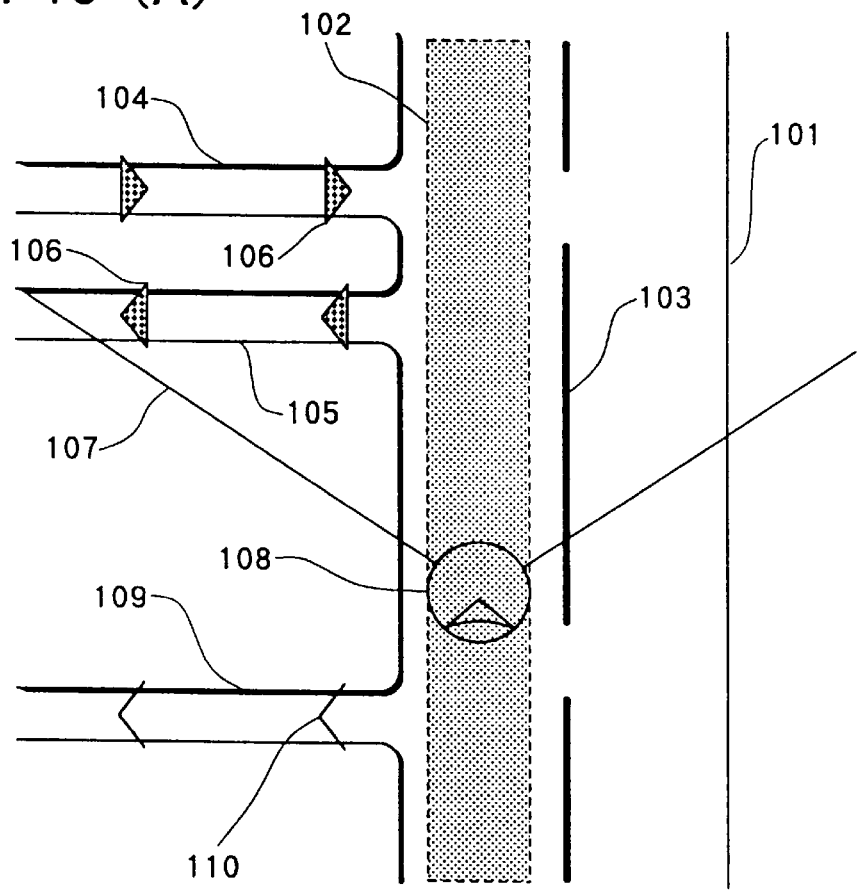
FIG. 19(A) is a view showing an example of a guidance screen which is displayed in the form of a structure-profiled map.
FIG. 19(B) is a view showing an example of display of a route.
Figure 19:
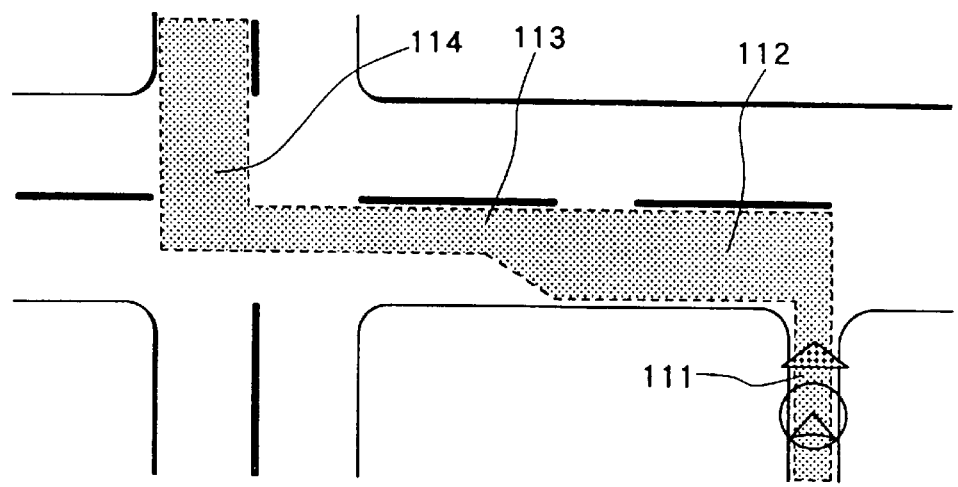
Figure 20:
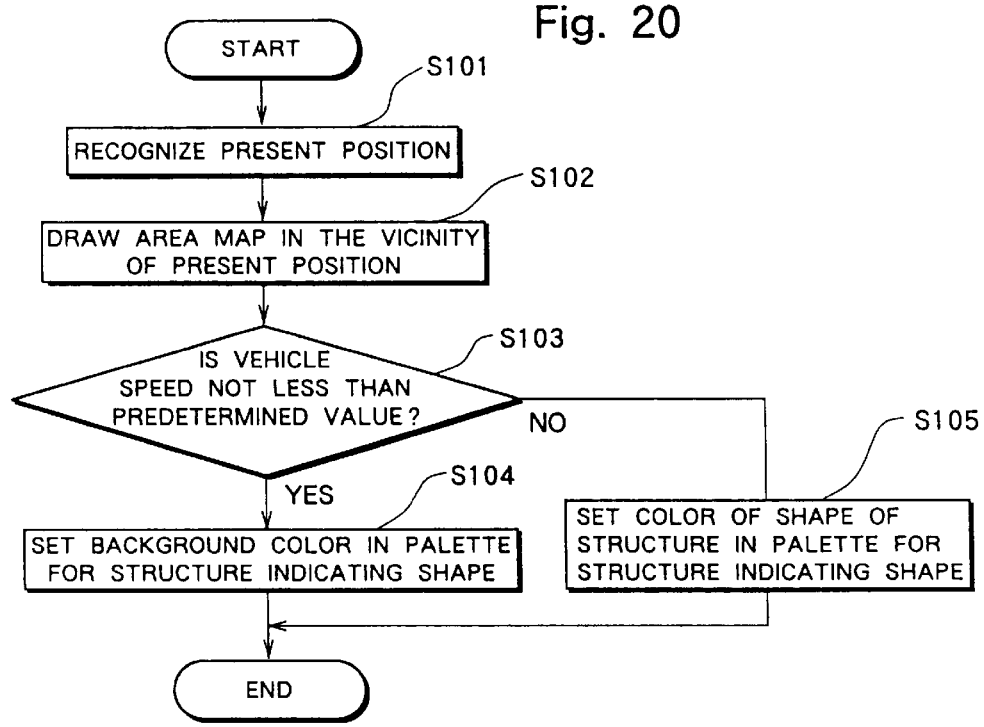
FIG. 20 is a flowchart showing an example of display processing for displaying a structure-representing shape.
Figure 21:
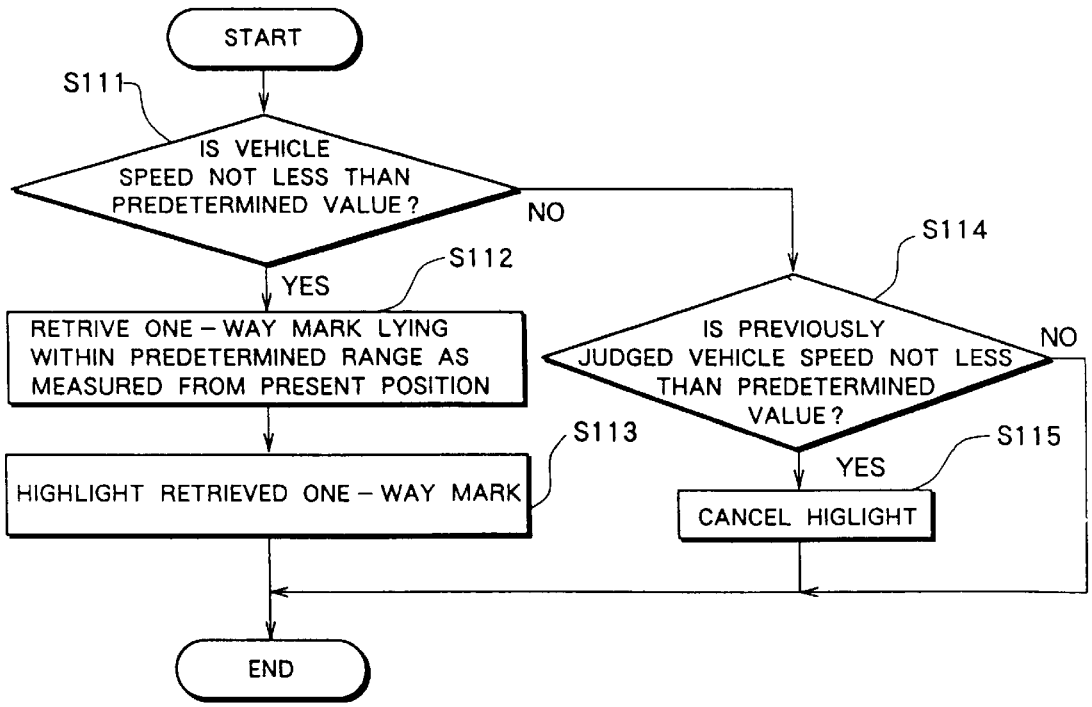
FIG. 21 is a flowchart showing an example of display processing for displaying a one-way mark.
Figure 22:
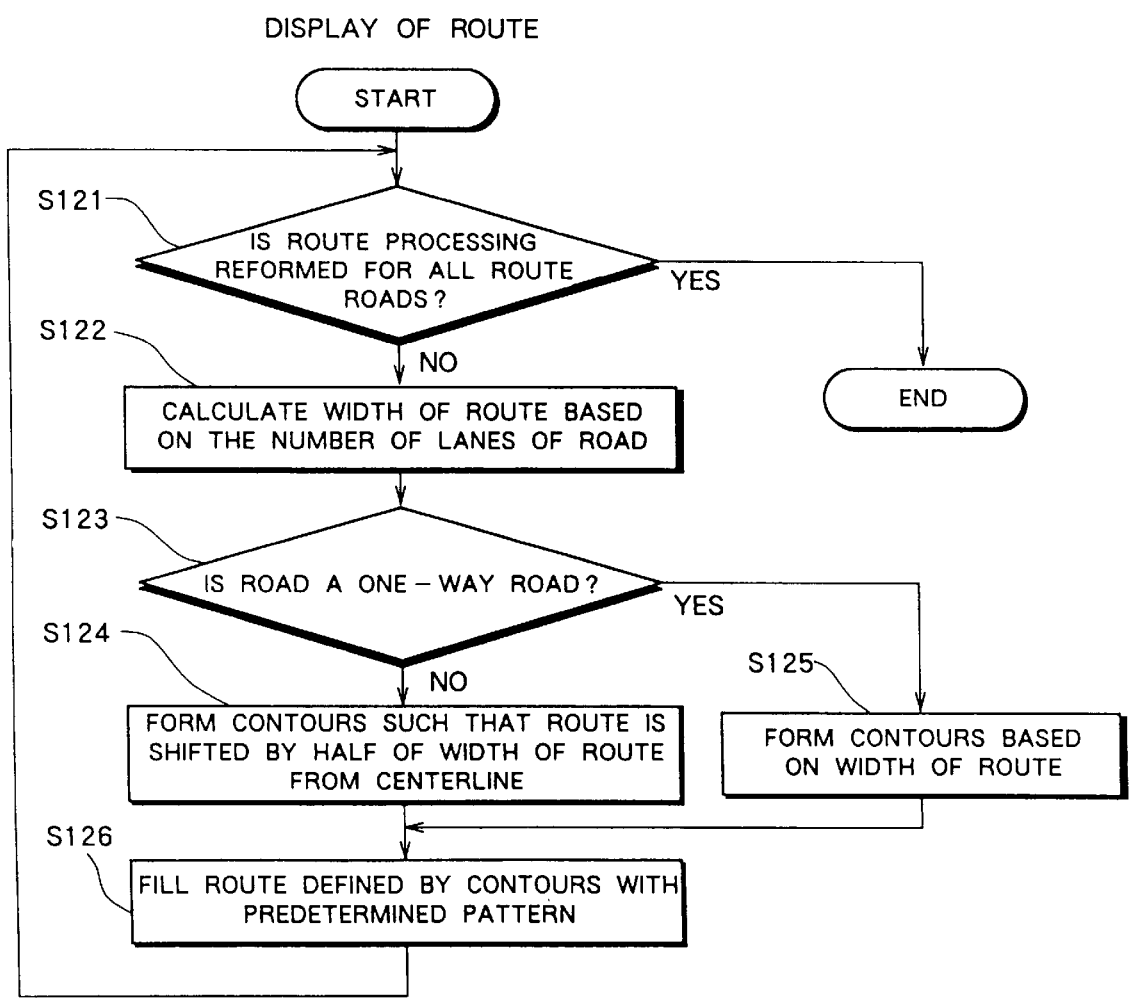
FIG. 22 is a flowchart showing an example of display processing for displaying a route.
Figure 23:
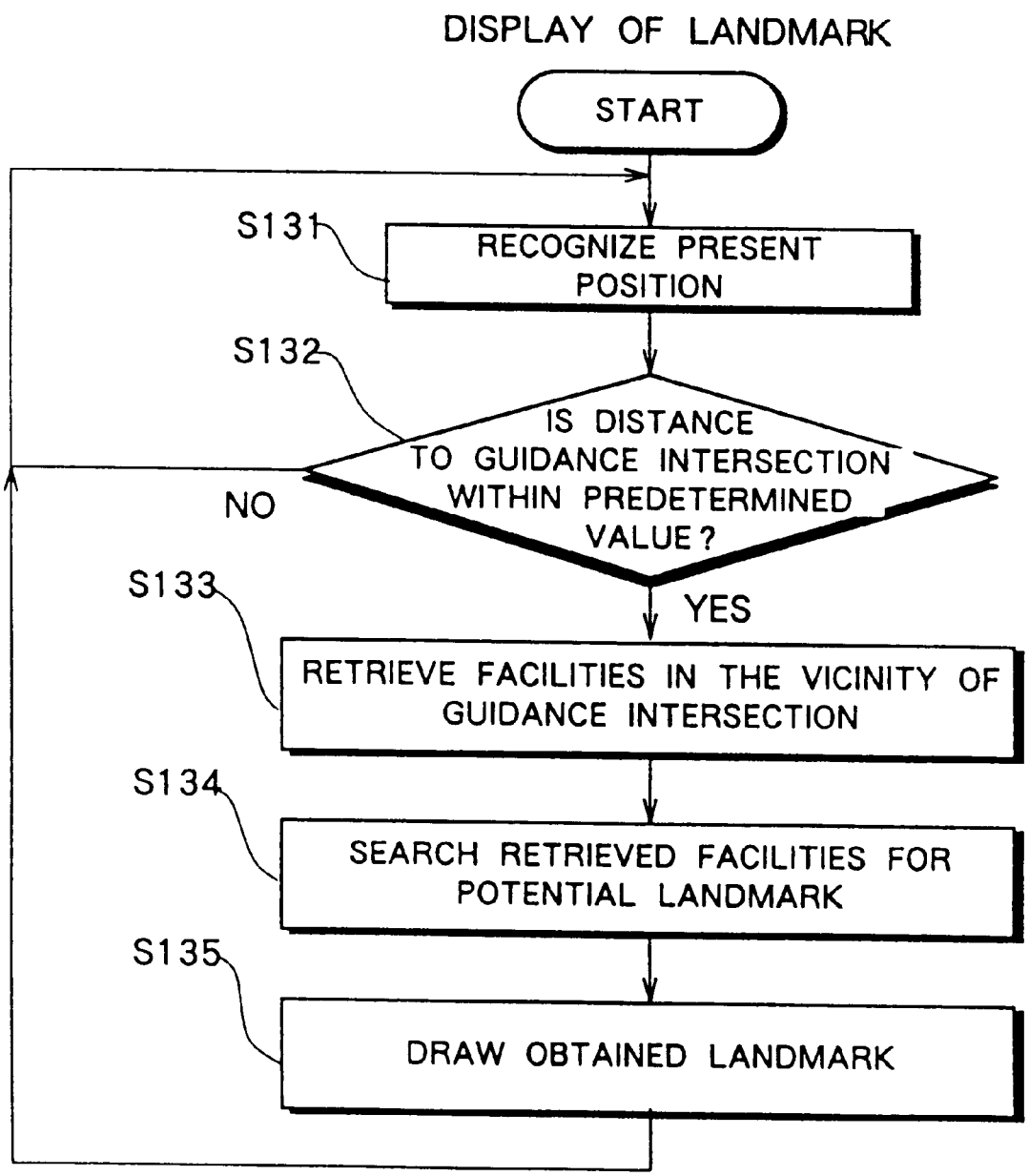
FIG. 23 is a flowchart showing an example of display processing for displaying a landmark.

FIG. 19(A) and 19(B) show an example of a guidance screen which is displayed in the form of a structure-profiled map. FIG. 20 shows a flowchart showing an example of display processing for displaying a structure-representing shape. FIG. 21 shows a flowchart showing an example of display processing for displaying a one-way mark. FIG. 22 shows a flowchart showing an example of display processing for displaying a route. FIG. 23 shows a flowchart showing an example of display processing for displaying a landmark.

In FIG. 19(A), numeral 101 denotes a road, numeral 102 denotes a guidance route, numeral 103 denotes a centerline, numerals 104, 105, and 109 denote one-way roads, numerals 106 and 110 denote one-way marks, numeral 107 denotes a retrieval boundary, and numeral 108 denotes a present position mark.

When a structure-profiled map is displayed on the guidance screen while the vehicle is traveling, basically are displayed the road 101, the one-way roads 104, 105, and 109, and the present position mark 108 indicating the present position on the road 101, as shown in FIG. 19(A). Moreover, information regarding a road and required for traveling is displayed in an easily recognizable manner (in a highlighted manner) and in accordance with the state of traveling. Such information includes information regarding the following: the one-way marks 106 and 110, a railroad crossing, a pedestrian crossing, and a landmark which is located along a road and readily recognizable. In this case, information required for traveling is information regarding a road in the vicinity of the present position. Examples of such information include information regarding a road which exists within a predetermined radius as measured from the present position, information regarding a road which extends from the present position along the heading direction of the vehicle, information regarding a road which exists ahead of the vehicle within a predetermined angle as measured from the heading direction of the vehicle, and information regarding a road which exists ahead of the vehicle within a predetermined distance as measured from the vehicle. Only these kinds of information are highlighted. When the vehicle is traveling at a relatively high speed, there is highlighted information regarding an area which is located relatively distantly from the present position of the vehicle. On the other hand, when the vehicle is traveling at a relatively low speed, there is highlighted information regarding an area which is located relatively close to the present position of the vehicle. In other words, the range of angle or distance for highlighted display may be varied in accordance with the speed of the vehicle. Information regarding the calculated guidance route 102 may be retrieved from storage means, and the retrieved information may be highlighted. Information regarding the guidance route 102 includes information regarding a road which is connected to the road 101 extending along the guidance route 102 and information regarding a road which exists in the vicinity of the road 101 extending along the guidance route 102. The retrieval boundaries 107 define the range for highlighted display and form a predetermined angle, for example ±60°, as measured from a line extending from the present position mark 108 in the heading direction of the vehicle. The storage means is searched for information regarding an area which is defined by the retrieval boundaries 107. For example, the one-way mark 106 falls within this defined range and thus is highlighted while the one-way mark 110 falls outside this defined range and thus is displayed in an ordinary mode. When the present position mark 108 is displayed at a position located below the one-way road 109, the one-way mark 110 is also highlighted. After the present position mark 108 has passed by the one-way road 109, the display mode of the one-way mark 110 changes from highlight to the ordinary display. Accordingly, in the structure-profiled map of FIG. 18(A), information not required for traveling such as a structure-representing shape is drawn in the same color as that of the background or is not drawn, as shown in FIG. 18(B). The guidance route 102 having a predetermined width is drawn based on coordinates and the number of lanes which are contained in guidance road data. When a mark and the like which are to be highlighted and are located ahead of the present position mark 108 are to be retrieved, a range which has a certain angle as measured from the heading direction of the vehicle is specified in the above-described manner. Alternatively, a range of retrieval may be determined based on the portion of the guidance route 102 located ahead of the present position mark 108 such that the rang of retrieval extends by a predetermined distance from either side of the guidance route 102. This is exemplified in FIG. 18(C), the structure-profiled map of which is prepared in the following manner. A structure-representing shape is erased from the structure-profiled map of FIG. 18(A) to thereby form the structure-profiled map of FIG. 18(B). Subsequently, the present position mark and a guidance route are added, the one-way mark as information regarding a road along the guidance route is highlighted, and marks indicating a school, a post office, and a gas station are additionally displayed.

Next will be described an example of display processing which is executed for a structure-profiled map in accordance with the state of traveling.

When a destination is designated on a displayed area map based on information regarding certain landmarks, it is desired that the structure-profiled map contains detailed information. However, while the vehicle is traveling, it is sufficient to highlight only information regarding a road. That is, display of information not related to a road such as structure-representing shape is not needed. Thus, as shown in FIG. 20, in display processing for displaying a structure-presenting shape, the present position is recognized (step S101). Next, a structure-profiled map of an area in the vicinity of the present position is drawn (step S102). Then, it is judged whether or not a vehicle speed is not less than a predetermined value (step S103). When the vehicle speed is not less than the predetermined value, a background color is set in a palette for each structure-representing shape so as to display the structure-profiled map as shown in FIG. 18(B), for example (step S104). When the vehicle speed is less than the predetermined value, a color, for example, as shown in FIG. 16(B) is set in the palette for each structure-representing shape so as to display the structure-profiled map as shown in FIG. 18(A) (step S105). In this display processing, whether or not each structure-representing shape is related to a guidance road can be judged based on the type of the structure-profiled map data, described with reference to FIG. 14. Accordingly, a structure-representing shape which belongs to a special type may be excluded from this display processing.

When the palette for a structure-representing shape whose display is not needed during traveling is changed to the palette of a background color based on a predetermined vehicle speed as described above, no structure-representing shape appears on a screen, but drawing processing for drawing a structure-representing shape is actually executed as in the case of displaying each structure-representing shape. When display processing is performed such that contents of display are switched by switching palettes between the case where the vehicle is traveling at not less than a predetermined speed and the case where the vehicle is parked or traveling at a lower speed, display processing required at the predetermined vehicle speed can be performed quickly. Also, the display control means may be provided with means for judging whether or not a predetermined requirement is satisfied. In this case, when it is judged that the predetermined requirement is satisfied, information required for display is fetched from the storage means, thereby subjecting only information required for display to drawing processing. This reduces drawing processing time. Thus, drawing processing can be performed quickly when high-speed drawing processing is needed as in the case where the vehicle is traveling at a relatively high speed or the screen is scrolled. Also, these processings may be selectively used as needed in accordance with judgement of the means for judging whether or not a predetermined requirement is satisfied.

Information regarding a road such as a one-way mark is selected and highlighted as information required for traveling along the heading direction. As shown in FIG. 21, in display processing for displaying the one-way mark, first, it is judged whether or not the vehicle velocity is not less than a predetermined value (step S111). When it is judged that the vehicle velocity is not less than the predetermined value, a one-way mark is retrieved which exists within a predetermined range as measured from the present position (step S112). The retrieved one-way mark is highlighted (step S113). When it is judged that the vehicle velocity is less than the predetermined value, it is judged whether or not the previously judged vehicle speed was not less than the predetermined value (step S114). When it is judged that the previously judged vehicle speed was not less than the predetermined value, the highlighted one-way mark is canceled, and the one-way mark is displayed in an ordinary mode (step S115). In this case, as described above, a one-way mark may be highlighted which lies in the vicinity of the present position. Alternatively, the range of retrieval may be set by means of distance or angle, and the range of retrieval may be varied in accordance with the vehicle speed. The above-described processing may be modified as follows. When a one-way mark cannot be retrieved because structure-profiled map data does not contain data regarding a one-way mark, data regarding type which is included in road data is referenced so, as to judge whether or not a road is a one-way road, and a one-way mark is displayed when the road is judged to be a one-way road. In addition to a one-way mark, a railroad crossing mark, a pedestrian crossing mark, a signal mark, and the like may be subjected to display control. Particularly, an entry-inhibited road may be highlighted. Highlight may be established as follows. Information to be highlighted is displayed more distinctively than other presently displayed information. Alternatively, only information to be highlighted may be displayed. In order to display only information which is to be highlighted, information other than that to be highlighted may be erased from a screen. Alternatively, only information to be highlighted is selected and subjected to drawing processing. In the example shown in FIG. 18(C), a one-way road lies behind the present position, but a one-way mark is not displayed for the one-way road because it is not along the heading direction of the vehicle. Accordingly, a one-way mark which was displayed for the one-way road as shown in FIG. 18(B) is deleted in FIG. 18(C) so that a one-way mark only along the heading direction of the vehicle is displayed. In this way, a highlighted display is provided.

When a route is displayed on a road map, a satisfactory display can be obtained by displaying each road in a particular color, because the road is displayed in a single line. However, when a route is displayed on a structure-profiled map, the route must be displayed off the centerline of a road because a road is displayed such that it has both side edge lines, a centerline, and width. As shown in FIG. 22, in display processing for displaying a route, first, it is judged whether or not route processing has been performed for all route roads which are identified by individual road Nos. included in guidance road data (step S121). Next, the width of the route is calculated based on the number of lanes of a route road (step S122). Then, it is judged whether or not the road is a one-way road (step S123). When it is judged that the road is a one-way road, the contours of the route are formed based on the width of the route (step S125). When it is judged that the road is not a one-way road, the contours of the route are formed such that the route is shifted by half of the width of the route from the centerline of the road toward the lane on which the vehicle is traveling, so that the route does not project into the opposite lane (step S124). Subsequently, as represented by numerals 102 and 111 to 114 in FIG. 19 and as shown in FIG. 18(C), the route defined by the contours is filled with a predetermined pattern (step S126).

As shown in FIGS. 5 and 6, guidance road data which are created based on road map data contain information regarding roads. Thus, through use of information regarding roads, a route can be adequately superimposed on a structure-profiled map. Further, the route can be displayed with a widthwise shape filled with a shaded pattern such as a meshed pattern. As a result, information regarding a road, such as information regarding a lane and the name of a road, can be more recognizably displayed. Also, through use of travel guidance data "offset rightward," "offset leftward," and "at the center" shown in FIG. 6(D), even when there are a plurality of lanes, a certain particular lane is selected from them, and a route is displayed on the selected lane as represented by numeral 113 in FIG. 19(B). In FIG. 19(B), a route is displayed in the following manner. Since the present position lies on a one-way road, the pattern of route 111 is displayed at the center of the road. The route 111 on the one-way road turns to the left when it reaches a main road, and becomes route 112. A route 113 following the route 112 turns to the right at a subsequent intersection and becomes route 114. In this case, the pattern formed by the routes 112 and 113 recommends a driver to change the traveling lane to a lane adjacent to the centerline of the main road.

Conventionally, in the case of providing route guidance through use of a road map, in order to provide better visibility of guidance information, the road map is switched to a detailed intersection guidance map when the vehicle approaches a guidance intersection. However, in the case of providing route guidance through use of a structure-profiled map, since the structure-profiled map itself has detailed information, a distinctive landmark is displayed as guidance when the vehicle approaches a guidance intersection. Thus, it is not necessary to display an intersection guidance map. As shown in FIG. 23, in display processing for displaying a landmark, first, the present position is recognized (step S131). Next, it is judged whether or not a distance to a guidance intersection is within a predetermined value (step S132). When it is judged that the distance is within the predetermined value, facilities in the vicinity of the guidance intersection are retrieved (step S133). Then, some of the retrieved facilities which can be used as landmarks are searched (step S134). The obtained landmark is drawn (step S135). For example, when there lie in the vicinity of a guidance intersection a gas station, a bank, public facilities (a police station, a fire station, a public office, a post office, a school, etc.), a convenience store, a family restaurant, and the like, a corresponding service mark or character or the like is displayed as a landmark as shown in FIG. 18(C). Thus, intersection guidance and route guidance can be provided more recognizably without switching the structure-profiled map to an intersection map in contrast with a conventional navigation apparatus. When, an ordinary symbol mark is not available for a certain landmark, it may be represented by a character such as "PUBLIC OFFICE" in FIG. 18(C). A predetermined value which is used as a reference value for judging a distance to a guidance intersection may be varied in accordance with the vehicle speed. Through employment of means for retrieving information regarding a landmark or landmarks in the vicinity of the detected present position, a relevant landmark or landmarks are displayed as the present position moves, thereby facilitating confirmation of the present position. Also, through employment of means for retrieving information regarding a landmark or landmarks in the vicinity of a route, only a landmark or landmarks lying along the route may be displayed. Further, a landmark or landmarks to be displayed may be controlled through retrieval of information regarding a landmark or landmarks which lie ahead of the present position in the heading direction of the vehicle. When a landmark or landmarks in the vicinity of the present position are to be displayed, the range or distance of retrieval may be varied in accordance with the vehicle speed. Alternatively, information may be retrieved over a wide range, and information of a landmark or landmarks to be displayed may be selected and displayed in accordance with the vehicle speed.

Figure 24:
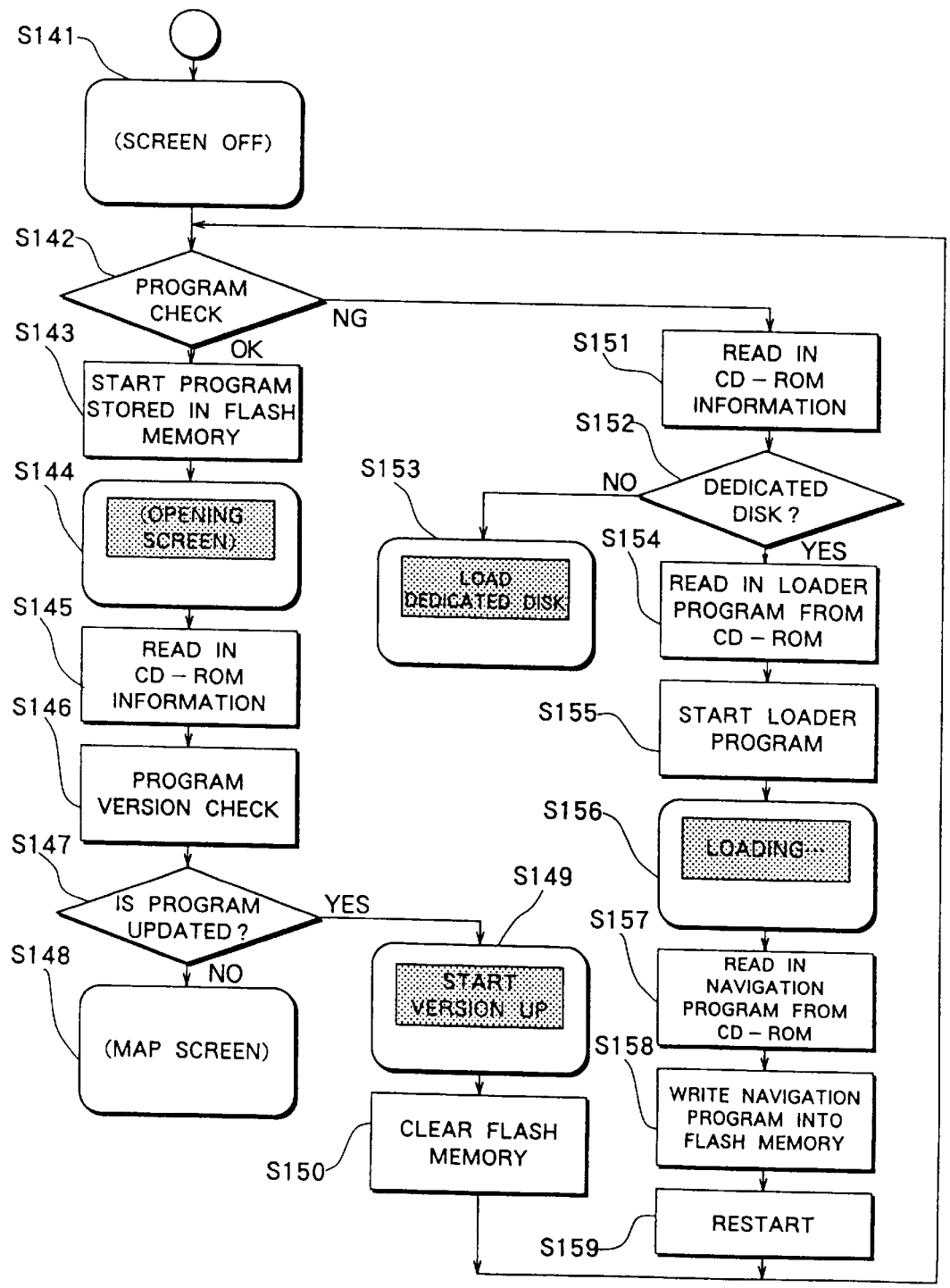
FIG. 24 is a flowchart showing a program loading operation.
Figure 25:
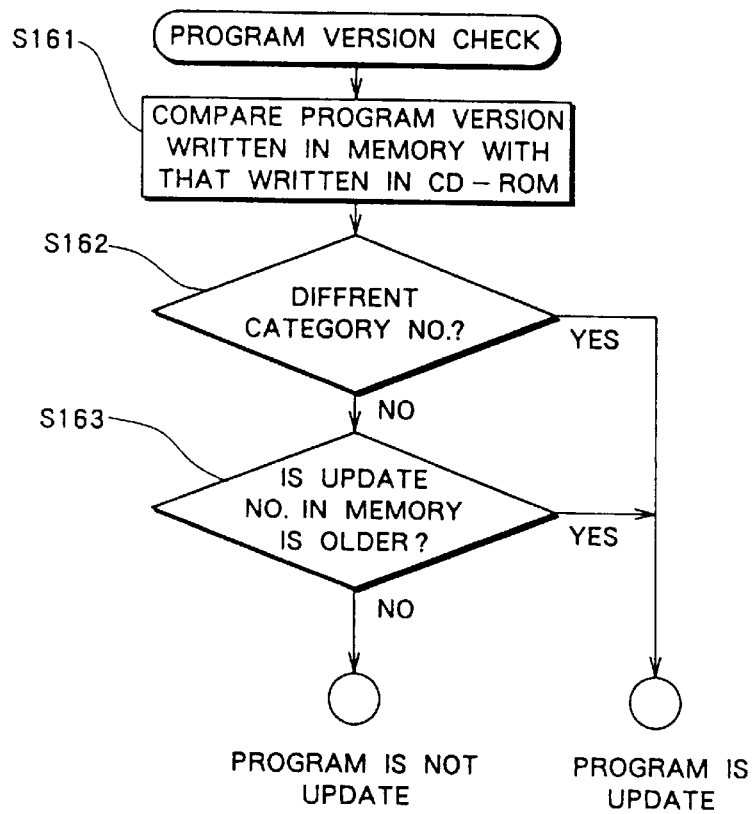
FIG. 25 is a flowchart showing a program version check operation.
Figure 26:
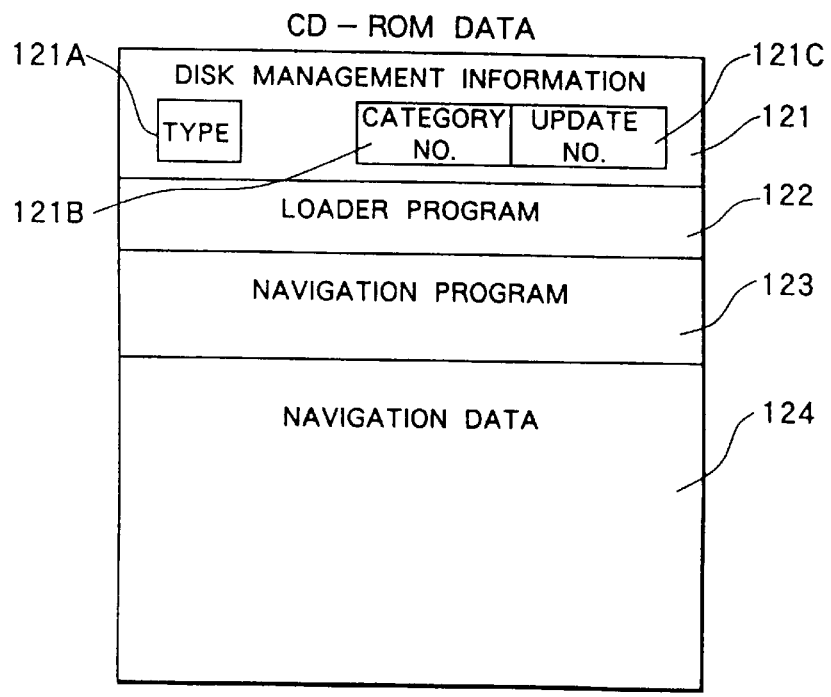
FIG. 26 is a diagram showing the structure of CD-ROM data.

Next will be described a system operation for loading a program into the flash memory 31 from a CD-ROM of the information storage unit 50 in which a program and data are recorded. FIG. 24 shows a program loading operation. FIG. 25 shows a program version check operation. FIG. 26 shows the structure of CD-ROM data.

The navigation apparatus according to the present invention has the second ROM 26 which contains a program (program read in means) for starting up the flash memory 31 and a CD-ROM drive. The flash memory 31 has a relatively large capacity for containing a program which is read in from the CD-ROM of an external storage unit as described above. The flash memory 31 retains stored information even when power is shut off. That is, the flash memory 31 is nonvolatile storage means. In a CD-ROM drive start-up operation, the program which is contained in the second ROM 26 and functions as program read in means is started to check a program stored in the flash memory 31 as well as to read in disk management information and the like from the CD-ROM of the information storage unit 50. It is judged from the disk management information and the status of the flash memory 31 whether to perform a program loading operation (update operation).

As shown in FIG. 24, first, when power is switched on, while the screen is held off (step S141), a program check is performed to check to see whether a program is properly written into the flash memory 31 (step S142). When it is judged that the program is properly written into the flash memory 31, the program is started (step S143). An opening screen is displayed (step S144). Disk management information is read in from the CD-ROM (step S145). A program version check is performed to compare version No. of the program read from the CD-ROM with version No. of the program stored in the flash memory 31 (step S146). Based on the result of this version check, it is judged whether to update the program stored in the flash memory 31 (step S147). When the version of the program read from the CD-ROM is not newer than that of the program stored in the flash memory 31, the program stored in the flash memory 31 is executed without being updated, thereby displaying a map screen (step S148). When the program read from the CD-ROM is upgraded, a version up screen is displayed (step S149). Subsequently, the flash memory 31 is cleared (step S150), and then processing returns to step S142.

When, in step S142, it is judged that the program is not properly written into the flash memory 31, disk management information is read in from the CD-ROM (step S151). Then, it is checked whether or not the loaded disk is a dedicated disk (step S152). When the loaded disk is found to not be a dedicated disk, a guide message "Load a dedicated disk" is displayed on a screen (step S153). When the loaded disk is found to be a dedicated disk, a loader program is read in from the CD-ROM (step S154). Subsequently, the loader program is started (step S155). A message "Loading . . . " is displayed (step S156), while a navigation program is being read in from the CD-ROM (step S157) and written into the flash memory 31 (step S158). Then, the system of the navigation apparatus is restarted (step S159), and processing returns to step S142. As has been described, in the case where the program is properly written into the flash memory 31, even when a compatible CD-ROM is loaded, the program stored in the flash memory 31 is not updated unless the program stored in the CD-ROM is found by program version check to have a newer version than the program stored in the flash memory 31. Thus, an unnecessary program loading operation can be avoided, and the system can be operated using a program of the latest version.

The program version check operation in steps S146 and S147 will now be described in detail. As shown in FIG. 25, a program version stored in the flash memory 31 is compared with that stored in the CD-ROM (step S161) to check to see whether the same category No. is written (step S162). When the same category No. is written in the flash memory 31 and the CD-ROM, it is further checked whether or not update No. written in the flash memory 31 is older than that stored in the CD-ROM (step S163). When category No. written in the flash memory 31 is different from that written in the CD-ROM or when the same category No. is written, but update No. written in the flash memory 31 is older than that written in the CD-ROM, the program stored in the flash memory 31 is updated. When the same category No. is written and also update No. written in the flash memory 31 is not older than that written in the CD-ROM, the program stored in the flash memory 31 is not updated.

As shown in FIG. 26, CD-ROM data is composed of disk management information 121, a loader program 122, a navigation program 123, and navigation data 124. The disk management information 121 includes a type 121A, category No. 121B, and update No. 121C. The type 121A indicates that the CD-ROM is a navigation CD, a music CD, a video CD, or the like. The category No. 121B indicates a category of the navigation CD, examples of which include the following: local version, nationwide version, sightseeing use, leisure use, and other genres. In a local version of a navigation CD, area data is stored in the form of coordinates, so that an area can be identified by the coordinates. As described before, the navigation program is composed of a map drawing section, a route determining section, a route guidance section, a present position calculating section, and a destination set-up operation/control section, and further includes an application section for performing signal output processing for navigation and an OS section. Navigation data include map data, determination data, guidance data, matching data, and destination data.

When the program read in means is combined with a CD changer, a CD can be automatically changed under an instruction to change. When a CD is specified, the disk management information (disk label) 121 is read in from the CD. Subsequently, the disk management information 121 is interpreted to select a CD which is to be driven. When the selected CD is a navigation CD, the category No. 121B and the update (version) No. 121C of the CD are confirmed, and then the above-described update operation is executed for the program memory.

The present invention is not limited to the above-described embodiments, but may be modified in various forms. For example, in the above-described embodiments, a displayed route is represented only by a meshed pattern. However, the meshed pattern may be modified in accordance with direction-to-go data shown in FIG. 5(E), road attribute data shown in FIG. 6(A), and road name data shown in FIG. 6(B). Also, display of a map may be switched over in the following manner. A road map is displayed until the vehicle approaches an area in the vicinity of a destination, and the road map is switched to a structure-profiled map when the vehicle reaches the area in the vicinity of the destination.

As seen from the description above, according to the present invention, a route is displayed on a structure-profiled map on which a road is displayed with a widthwise shape corresponding to an actual road, and also displayed on the structure-profiled map such that the route does not fall on the centerline of a road and such that the width of the route corresponds to the width of a displayed road. Thus, a route is displayed in a readily visible manner. Also, highlighted display of information regarding a road in the vicinity of the present position may be combined with limitation to display of a structure-representing shape. This provides guidance such that a driver can readily confirm a route and the present position on a structure-profiled map while the vehicle is traveling. Further, in the case where there lie a plurality of lanes on the traveling side of a road, a route is displayed along the selected lane so as to show a lane change to be performed before reaching a guidance intersection.

The present invention is not limited to the above-described embodiments, but may be modified within the scope of the appended claims.

What is claimed is:

1. A navigation apparatus for a vehicle in which an entire route from a start point to a designated destination is determined, the present position of the vehicle is detected, and route guidance processing is executed based on the detected present position, said navigation apparatus comprising:

(a) information storage means for storing data regarding a road-profiled map on which a road is displayed with a widthwise shape;

(b) present position detecting means for detecting the present position of the vehicle;

(c) matching means for comparing the track of the present position detected by said present position detecting means with the shape of a road, so as to judge whether they match; and (d) display control means for shifting the present position onto a road which has been judged by said matching means to correspond to the track of the present position, and for displaying the present position on the road appearing on the road-profiled map.

2. A navigation apparatus for a vehicle according to claim 1, wherein said information storage means contains information regarding one-way traffic, and said display control means modifies the position of display of the present position based on the information regarding one-way traffic.

3. A navigation apparatus for a vehicle according to claim 1, wherein said display control means is adapted to display the present position at the center of a road when the road is judged to be a one-way road, as well as to display the present position at a position shifted by a predetermined amount from the center of a road when the road is judged to not be a one-way road.

4. A navigation apparatus for a vehicle in which an entire route from a start point to a designated destination is determined, the present position of the vehicle is detected, and route guidance processing is executed based on the detected present position, said navigation apparatus comprising:

(a) storage means for storing data regarding a road map in which a road is represented using road data composed of data regarding nodes, as well as for storing data regarding a road-profiled map on which a road is displayed with a widthwise shape;

(b) map information switching means for switching the road map to and from the road-profiled map; and (c) matching means for converting the detected present position of the vehicle to a coordinate on the road data, wherein (d) said information storage means contains information regarding the width of each road, (e) said matching means further shifts the converted coordinate by a predetermined amount in accordance with the width of a road on which the present position lies, thereby displaying the present position at the shifted coordinate, when the road-profiled map is displayed by said map information switching means.

5. A navigation apparatus for a vehicle which displays a structure-profiled map on which a structure-presenting shape and a road are drawn, so as to provide road guidance, said navigation apparatus comprising:

(a) recording-medium read out means for reading out a program and data from a recording medium so as to display for road guidance a structure-profiled map on which a structure-presenting shape and a road are drawn;

(b) nonvolatile recording means for recording the program;

(c) program read in means for reading into said nonvolatile recording means a program which is read out from the recording medium through said recording-medium read out means;

(d) display means for displaying the structure-profiled map; and (e) processing means for executing a program, which is read in through said program read in means, so as to display the structure-profiled map on the display means based on data which is read out from the recording medium through said recording-medium read out means, and for thereby providing road guidance, wherein (f) a route is displayed along a road which is displayed on the structure-profiled map for guidance.

6. A recording medium for use in a navigation apparatus in which is displayed a structure-profiled map on which a structure-representing shape and a road, displayed with sides spaced by a transverse dimension to define a widthwise shape, are drawn, so as to provide road guidance, said recording medium storing:

structure-profiled map data including information regarding the shape of various kinds of structures as well-as attribute information regarding the structures and widthwise shape of roads; and a program for displaying the shape and name of each structure based on said structure-profiled map data as well as for displaying a route on a structure-profiled map along a road and for transversely positioning the route relative to the widthwise shape of the road, based on said structure-profiled map data.

7. A navigation apparatus for a vehicle according to claim 6, wherein the transverse positioning of said route relative to the widthwise shape of the road is based on whether the road is a one-way road or a two-way road.

8. A navigation apparatus for a vehicle according to claim 6, wherein the transverse positioning of said route relative to the widthwise shape of the road is in accordance with guidance information regarding right-turn/left-turn at an intersection located ahead of the present position and an associated change of lanes on which the vehicle is to travel.

9. A navigation apparatus for a vehicle in which an entire route from a start point to a designated destination is determined and the vehicle is guided to the destination in accordance with the determined route, said navigation apparatus comprising:

information storage means for storing data for road-profiled maps on which a road is displayed with sides spaced by a transverse dimension to define a widthwise shape;

present position detecting means for detecting the present position of the vehicle;

judging means for judging, on the basis of the present position detected by said present position detecting means, a road along which the vehicle is travelling;

display means for displaying a road-profiled map of a vicinity around the detected present position; and display control means for reading out data from said information storage means for the road-profiled map of the vicinity inclusive of data for the judged road, for selecting a transverse position for a present position mark on the basis of the data read for the judged road to show the detected position of the vehicle relative to the spaced sides of the judged road, for outputting the road-profiled map of the vicinity to said display means with the judged road displayed with a widthwise shape together with the present position and for controlling the displayed position of the present position mark on the road-profiled map of the vicinity in accordance with the detected present position and the selected transverse position.

10. A navigation apparatus for a vehicle according to claim 9, wherein said determined route is displayed such that said determined route is shifted from the centerline of the judged road onto a lane of the judged road on which the vehicle is travelling.

11. A navigation apparatus for a vehicle according to claim 9, wherein the display of said route is controlled by said display control means depending on whether or not the judged road is a one-way road.

12. A navigation apparatus for a vehicle according to claim 9, wherein said determined route is displayed using a pattern whose width corresponds to the width of the judged road on which the vehicle is traveling.

13. A navigation apparatus for a vehicle according to claim 9, wherein the display of said determined route is performed depending on whether the judged road is a one-way road or a two-way road.

14. A navigation apparatus for a vehicle according to claim 9, wherein the display of said route is controlled by said display control means to provide guidance information regarding right-turn/left-turn at an intersection located ahead of the present position and an associated change of lanes in which the vehicle is to travel.

15. A navigation apparatus for a vehicle according to claim 9, wherein said display control means controls display of the present position mark so that a driver of the vehicle can recognize the lane in which the vehicle is travelling.

16. A navigation apparatus for a vehicle according to claim 9, wherein said display control means is adapted to display the present position at the center of a road when the road is judged to be a one-way road, as well as to display the present position at a position shifted by a predetermined amount from the center of a road when the road is judged to not be a one-way road.

17. A navigation apparatus for a vehicle according to claim 9, wherein said display control means controls the display of the present position mark so that the present position mark is displayed in a travel lane in which the vehicle is travelling, said travel lane being displayed along with additional lanes of the judged road.

18. A navigation apparatus for a vehicle in which an entire route from a start point to a destination is calculated, and visual or voice guidance is provided as the present position of the vehicle moves, said navigation apparatus comprising:

(a) storage means for storing structure shape information which includes information regarding roads;

(b) range-of-display determining means for determining the range of display for a route which is calculated based on information regarding a road which is stored in said storage means; and (c) display control means for superimposing a route on a road, based on the structure shape information stored in said storage means as well as the range of display determined by said range-of-display determining means, so as to create map information and to display the created information.

19. A navigation apparatus for a vehicle according to claim 18, wherein said range-of-display determining means determines the range of display such that a guidance route is displayed in a state in which the guidance route is shifted from the centerline of a road onto a lane on which the vehicle is traveling.

20. A navigation apparatus for a vehicle according to claim 18, wherein said range-of-display determining means determines the range of display depending on whether not the road is a one-way road.

21. A navigation apparatus for a vehicle according to claim 18, wherein said range-of-display determining means determines the range of display using a pattern whose width corresponds to the width of a road on which the vehicle is traveling.

22. A navigation apparatus for a vehicle according to claim 18, wherein said range-of-display determining means determines the range of display depending on whether the road is a one-way road or a two-way road and in accordance with guidance information regarding right-turn/left-turn at an intersection located ahead of the present position and an associated change of lanes on which the vehicle is to travel.

23. A navigation apparatus for a vehicle according to claim 18, wherein the display of said route superimposed on a road is determined based on whether the road is a one-way road or a two-way road.

24. A navigation apparatus for a vehicle according to claim 18, wherein the display of said route is superimposed on a road in accordance with guidance information regarding right-turn/left-turn at an intersection located ahead of the present position and an associated change of lanes on which the vehicle is to travel.

25. A navigation apparatus for a vehicle comprising:

(a) present position detecting means for detecting the present position of the vehicle;

(b) route calculating means for calculating a route from a start point to a destination;

(c) storage means for storing structure shape information which includes information regarding roads;

(d) range-of-display determining means for determining the range of display for a route which is calculated by said route calculating means based on information regarding a road which is stored in said storage means;

(e) display means for displaying map information regarding an area in the vicinity of the present invention based on the present position detected by said present position detecting means and guidance information stored in said storage means; and (f) display control means for controlling display information to be displayed on said display means, wherein (g) said display control means controls display information such that the route is superimposed on a map displayed on said display means, based on the range of display determined by said range-of-display determining means.

26. A navigation apparatus for a vehicle according to claim 25, wherein said range-of-display determining means determines the range of display such that a guidance route is displayed in a state in which the guidance route is shifted from the centerline of a road onto a lane on which the vehicle is traveling.

27. A navigation apparatus for a vehicle according to claim 25, wherein said range-of-display determining means determines the range of display depending on whether not the road is a one-way road.

28. A navigation apparatus for a vehicle according to claim 25, wherein said range-of-display determining means determines the range of display using a pattern whose width corresponds to the width of a road on which the vehicle is traveling.

29. A navigation apparatus for a vehicle according to claim 25, wherein said range-of-display determining means determines the range of display depending on whether the road is a one-way road or a two-way road and in accordance with guidance information regarding right-turn/left-turn at an intersection located ahead of the present position and an associated change of lanes on which the vehicle is to travel.

* * * * *

UNITED STATES PATENT AND TRADEMARK OFFICE
CERTIFICATE OF CORRECTION

PATENT NO. : 6,035,253
DATED : March 7, 2000
INVENTOR(S) : HAYASHI et al

It is certified that error appears in the above-identified patent and that said Letters Patent is hereby corrected as shown below:

Col. 4, line 50, "presenting" should read –representing–.

Col. 9, line 7, "I-+,crc VII+ee" should read –①-⑪–;

line 15, "①" should read --①,–;

line 43, "8(A) and 8(B)" should read –6(A)-6(D)–.

Col. 13, line 1, "FIG, 8" should read –Figs. 8(A) and 8(B)–.

Col. 21, line 27, "a times" should read --α times–.

Signed and Sealed this

Fifteenth Day of May, 2001

*Attest:*

NICHOLAS P. GODICI

*Attesting Officer*     *Acting Director of the United States Patent and Trademark Office*